US008295673B2

(12) United States Patent
Mae et al.

(10) Patent No.: US 8,295,673 B2
(45) Date of Patent: Oct. 23, 2012

(54) APPARATUS, METHOD, AND COMPUTER PROGRAM FOR PROCESSING INFORMATION

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1196 days.

(21) Appl. No.: 11/820,576

(22) Filed: Jun. 19, 2007

(65) Prior Publication Data

US 2007/0297769 A1 Dec. 27, 2007

(30) Foreign Application Priority Data

Jun. 23, 2006 (JP) ................................ P2006-173751

(51) Int. Cl.
*H04N 5/765* (2006.01)

(52) U.S. Cl. ........................................................ 386/232

(58) Field of Classification Search ........... 386/230–248, 386/270, 283, 288, 286, 211, 329, 343, 289
See application file for complete search history.

(56) References Cited

U.S. PATENT DOCUMENTS 6,369,835 B1 4/2002 Lin
6,549,721 B1 * 4/2003 Ando et al. .................... 386/241
6,842,580 B1 * 1/2005 Ueda et al. ..................... 386/248
7,046,260 B2 * 5/2006 Frimout et al. ............... 345/660
7,062,758 B2 * 6/2006 Yokoyama ..................... 717/136
7,826,721 B2 * 11/2010 Ishii et al. ...................... 386/224
2002/0110354 A1 8/2002 Ikeda et al.
2003/0202778 A1 * 10/2003 Yoshioka ........................ 386/95
2004/0022522 A1 2/2004 Terada
2004/0101279 A1 5/2004 Ikeda et al.
2004/0151472 A1 8/2004 Seo et al.
2005/0008330 A1 * 1/2005 Uno ................................. 386/52
2005/0083414 A1 * 4/2005 Hidaka et al. .............. 348/220.1
2005/0149579 A1 * 7/2005 Tsubaki et al. ............... 707/200
(Continued)

FOREIGN PATENT DOCUMENTS

EP 1 4675 62 10/2004
(Continued)

OTHER PUBLICATIONS

Totally HIP Software et al: "Liveslideshow User's Manual" Internet Citation, [Online] 2001, XP 002386607 Retrieved from the Internet:URL:http://stagedoor.total iyhip.com/direct.asp?TOPIC=Resource&RESOURCE_ID=8&ITEM_ID=3>.

(Continued)

*Primary Examiner* — Thai Tran
*Assistant Examiner* — Stephen Smith
(74) *Attorney, Agent, or Firm* — Lerner, David, Littenberg, Krumholz & Mentlik, LLP

(57) ABSTRACT

An information processing apparatus includes an encoding and decoding unit for performing a data conversion process by decoding encoded still image data acquired from an information recording medium and generating moving image encoded data based on the decoded still image data, a medium control unit for performing a data re-recording process by recording the moving image encoded data, generated by the encoding and decoding unit, on the information recording medium in a predetermined data recording format, and a controller for controlling the data conversion process of the encoding and decoding unit and the data re-recording process of the medium control unit. The controller controls the data conversion process and the data re-recording process in response to user input information as to whether to execute the data conversion process.

20 Claims, 31 Drawing Sheets

U.S. PATENT DOCUMENTS

| | | | | |
|---|---|---|---|---|
| 2005/0175326 | A1* | 8/2005 | Kim et al. | 386/126 |
| 2005/0201718 | A1 | 9/2005 | Kato | |
| 2005/0238321 | A1 | 10/2005 | Gohara et al. | |
| 2006/0034585 | A1 | 2/2006 | Terada | |
| 2006/0120696 | A1* | 6/2006 | Ando et al. | 386/95 |
| 2006/0153014 | A1* | 7/2006 | Higgins | 369/30.01 |

FOREIGN PATENT DOCUMENTS

| | | | |
|---|---|---|---|
| JP | 10-200843 | A | 7/1998 |
| JP | 2003317398 | | 11/2003 |
| JP | 2005-303908 | A | 10/2005 |
| JP | 2006107624 | A | 4/2006 |
| JP | 2006115118 | | 4/2006 |

OTHER PUBLICATIONS

European Search Report EP 09002886, dated Aug. 26, 2011.

Office Action from Japanese Application No. 2008-258049, dated Aug. 10, 2010.

* cited by examiner

FIG. 12

| Syntax | No. of bits | Mnemonic |
|---|---|---|
| Movie PlayList File{ | | |
| TypeIndicator | 8*4 | bslbf |
| TypeIndicator2 | 8*4 | bslbf |
| PlayListStartAddress | 32 | uimsbf |
| PlaylistMarkStartAddress | 32 | uimsbf |
| ExtensionDataStartAddress | 32 | uimsbf |
| reserved | 160 | bslbf |
| blkApplicationPlayList() | | |
| for (i=0;i<N1;i++){ | | |
| padding_word | 16 | bslbf |
| } | | |
| 300 blkPlayList() | | |
| for (i=0;i<N2;i++){ | | |
| padding_word | 16 | bslbf |
| } | | |
| blkPlayListMark() | | |
| for (i=0;i<N3;i++){ | | |
| padding_word | 16 | bslbf |
| } | | |
| blkExtensionData() | | |
| for (i=0;i<N4;i++){ | | |
| padding_word | 16 | bslbf |
| } | | |
| } | | |

FIG. 13

| Syntax | No. of bits | Mnemonic |
|---|---|---|
| blkPlayList() { | | |
| Length | 32 | uimsbf |
| reserved | 16 | bslbf |
| 301 NumberOfPlayItems < INCREMENT BY 1 > | 16 | uimsbf |
| NumberOfSubPaths | 16 | uimsbf |
| for(PlayItem_id=0; PlayItem_id<NumberOfPlayItem_id++) { | | |
| 302 blkPlayItem() | | |
| } | | |
| for(SubPath_id=0; SubPath_id<NumberOfSubPaths_id++) { | | |
| blkSubPath() | | |
| } | | |
| } | | |

FIG. 14

| Syntax | No. of bits | Mnemonic |
|---|---|---|
| blkPlayItem() { | | |
| Length | 16 | uimsbf |
| ClipInformationFileName <FILE NAME> | 8*5 | bslbf |
| ClipCodecIdentifier | 8*4 | bslbf |
| reserved | 12 | bslbf |
| ConnectionCondition <1: non seamless> | 4 | bslbf |
| RefToSTCID <0> | 8 | uimsbf |
| INTime <PTS OF I-PIC> | 32 | uimsbf |
| OUTTime <PTS +1F FRAME TIME OF I-PIC> | 32 | uimsbf |
| blkUOMaskTable() | | |
| PlayItemRandomAccessFlag | 1 | bslbf |
| reserved | 7 | bslbf |
| StillMode <1> | 8 | bslbf |
| if(StillMode==0x01) { | | |
| StillTime <3> | 16 | uimsbf |
| } else { | | |
| reserved | 16 | bslbf |
| } | | |
| blkSTNTable() | | |
| } | | |

FIG. 15

| | Syntax | No. of bits | Mnemonic |
|---|---|---|---|
| | Clip information file{ | | |
| | TypeIndicator | 8*4 | bslbf |
| | TypeIndicator2 | 8*4 | bslbf |
| | SequenceInfoStartAddress | 32 | uimsbf |
| | ProgramInfoStartAddress | 32 | uimsbf |
| | CPIStartAddress | 32 | uimsbf |
| | ClipMarkStartAddress | 32 | uimsbf |
| | ExtensionDataStartAddress | 32 | uimsbf |
| | reserved | 96 | bslbf |
| 321 | blkClipInfo() | | |
| | for(i=0;i<N1;i++){ | | |
| | padding_word | 16 | bslbf |
| | } | | |
| 322 | blkSequenceInfo() | | |
| | for(i=0;i<N2;i++){ | | |
| | padding_word | 16 | bslbf |
| | } | | |
| 323 | blkProgramInfo() | | |
| | for(i=0;i<N3;i++){ | | |
| | padding_word | 16 | bslbf |
| | } | | |
| 324 | blkCPI() | | |
| | for(i=0;i<N4;i++){ | | |
| | padding_word | 16 | bslbf |
| | } | | |
| | blkClipMark() | | |
| | for(i=0;i<N5;i++){ | | |
| | padding_word | 16 | bslbf |
| | } | | |
| | blkExtensionData() | | |
| | for(i=0;i<N6;i++){ | | |
| | padding_word | 16 | bslbf |
| | } | | |
| | } | | |

FIG. 16

| Syntax | No. of bits | Mnemonic |
|---|---|---|
| blkClipInfo() { | | |
| Length | 32 | uimsbf |
| reserved | 16 | bslbf |
| ClipStreamType | 8 | bslbf |
| ApplicationType <2> | 8 | bslbf |
| reserved | 31 | bslbf |
| isCC5 <0> | 1 | bslbf |
| TSRecordingRate <$18\times10^6$> | 32 | uimsbf |
| NumberOfSourcePackets < FILE SIZE/192 > | 32 | uimsbf |
| reserved | 1024 | bslbf |
| TSTypeInfoBlock() | | |
| if(IsCC5==$1_b$) { | | |
| reserved | 8 | bslbf |
| FollowingClipStreamType | 8 | bslbf |
| reserved | 32 | bslbf |
| FollowingClipInformationFileName | 8*5 | bslbf |
| ClipCodecIdentifier | 8*4 | bslbf |
| reserved | 8 | bslbf |
| } | | |
| } | | |

FIG. 17

| Syntax | No. of bits | Mnemonic |
|---|---|---|
| blkSequenthInfo() { | | |
| Length | 32 | uimsbf |
| reserved | 8 | bslbf |
| '1' | 8 | uimsbf |
| SPN_ATC_start[0] <0> | 32 | uimsbf |
| number__of__STC__sequences[0] <1> | 8 | uimsbf |
| '0' | 8 | uimsbf |
| for(stc__id=0;<br>stc id<number__of__STC__sequence[0];stc__id++){ | | |
| PCR__PID[0][stc__id] <0x1001> | 16 | uimsbf |
| SPN__STC__start[0][stc__id] <0> | 32 | uimsbf |
| presentation__start__time[0][stc__id] < PTS OF FIRST I-PIC > | 32 | uimsbf |
| presentation__end__time[0][stc__id] < PTS+0.5 SECOND OF LAST I-PIC > | 32 | uimsbf |
| } | | |
| } | | |

FIG. 18

| Syntax | No. of bits | Mnemonic |
|---|---|---|
| blkProgramInfo(){ | | |
| Length | 32 | uimsbf |
| reserved | 8 | bslbf |
| '1' | 8 | uimsbf |
| SPN_program__sequence__start[0] <0> | 32 | uimsbf |
| program__map__PID[0] <0x0100> | 16 | uimsbf |
| number__of__streams__in__ps[0] <1> | 8 | uimsbf |
| reserved | 8 | bslbf |
| for(stream__index=0;<br>stream__index<number__of__streams__in__ps[0]<br>stream__index++){ | | |
| stream__PID[0][stream__index] <0x1001> | 16 | uimsbf |
| streamCodingInfo{0, stream__index} <(Primary Video) OMITTED> | | |
| } | | |
| } | | |

FIG. 19

401 (MovieObjects())

| Syntax | No. of bits | Mnemonic |
|---|---|---|
| MovieObject. bdmv{ | | |
| TypeIndicator | 8*4 | bslbf |
| TypeIndicator2 | 8*4 | bslbf |
| ExtensionDataStartAddress | 32 | uimsbf |
| reserved | 224 | bslbf |
| MovieObjects() | | |
| for (i=0;i<N1;i++){ | | |
| padding_word | 16 | bslbf |
| } | | |
| blkExtensionData() | | |
| for (i=0;i<N2;i++){ | | |
| padding_word | 16 | bslbf |
| } | | |
| } | | |

FIG. 20

| Syntax | No. of bits | Mnemonic |
|---|---|---|
| blkMovieObjects() { | | |
| Length | 32 | uimsbf |
| reserved | 32 | bslbf |
| NumberOfmobjs < INCREMENT BY 1 > | 16 | uimsbf |
| for(mobj_id=0; mobj_id<NumberOfmobjsmobj_id++) { | | |
| MovieObject[mobj_id]() { | | |
| TerminalInfo() { | | |
| '1' | 1 | bslbf |
| '0' | 1 | bslbf |
| '0' | 1 | bslbf |
| reserved | 13 | bslbf |
| } | | |
| number of navigation commands{mobj id} <1> | 16 | uimsbf |
| for(command_id=0; command_id<number_of_navigation_commands[mobj_id]; command id++){ <PlayPL#XXXX> | | |
| navigation commands{mobj id}[command_id] | 96 | bslbf |
| } | | |
| } | | |
| } | | |
| } | | |

FIG. 21

| Syntax | No. of bits | Mnemonic |
|---|---|---|
| Index. bdmv{ | | |
| TypeIndicator | 8 * 4 | bslbf |
| TypeIndicator2 | 8 * 4 | bslbf |
| IndexeStartAddress | 32 | uimsbf |
| ExtensionDataStartAddress | 32 | uimsbf |
| reserved | 192 | bslbf |
| ApplInfoBDMV() | | |
| for (i=0;i<N1;i++){ | | |
| padding_word | 16 | bslbf |
| } | | |
| Indexes() (421) | | |
| for (i=0;i<N2;i++){ | | |
| padding_word | 16 | bslbf |
| } | | |
| blkExtensionData() (422) | | |
| for (i=0;i<N3;i++){ | | |
| padding_word | 16 | bslbf |
| } | | |
| } | | |

FIG. 22

| Syntax | No. of bits | Mnemonic |
|---|---|---|
| Indexes{ | | |
| length | 32 | bslbf |
| FirstPlayback(){ | | |
| '01' | 2 | uimsbf |
| reserved | 30 | bslbf |
| AVCHDTitleplaybacktype | 2 | uimsbf |
| reserved | 14 | bslbf |
| FirstPlaybackmobjidref | 16 | uimsbf |
| reserved | 8*4 | bslbf |
| } | | |
| TOPMenu(){ | | |
| '01' | 2 | uimsbf |
| reserved | 30 | bslbf |
| '01' | 2 | uimsbf |
| reserved | 14 | bslbf |
| TopMenumobjidref | 16 | uimsbf |
| reserved | 8*4 | bslbf |
| } | | |
| numberofTitles < INCREMENT BY 1 > | 16 | uimsbf |
| for(title__id=0;<br>title__id<number__of__Titles;<br>title__id++)( | | |
| Title[title__id](){ | | |
| '01' | 2 | uimsbf |
| '00' | 2 | uimsbf |
| reserved | 28 | bslbf |
| '00' | 2 | uimsbf |
| reserved | 14 | bslbf |
| Title__mobj__id__ref[title__id] < SET ADDITIONAL mobj NUMBER > | 16 | uimsbf |
| reserved | 8*4 | bslbf |
| } | | |
| } | | |
| } | | |

FIG. 23

| Syntax | No. of bits | Mnemonic |
|---|---|---|
| ExtensionData() { | | |
| length | 32 | uimsbf |
| if(length !=0) { | | |
| data_block_start_address | 32 | uimsbf |
| reserved | 24 | bslbf |
| number_of_ext_data_entries | 8 | uimsbf |
| for (i=0;i<number_of_ext_data_entries;i++) { | | |
| ext_data_entry() { | | |
| ID1 <XXXX (REPRESENTING AVCHD)> | 16 | uimsbf |
| ID2 <XXXX (REPRESENTING VERSION)> | 16 | uimsbf |
| ext_data_start_address | 32 | uimsbf |
| ext_data_length | 32 | uimsbf |
| } | | |
| } | | |
| for (i=0<;i<L1;i++) { | | |
| padding_word | 16 | bslbf |
| padding_word | 16 | bslbf |
| } | | |
| data_block | 32+ 8 * (length − data_block_start_address) | |
| } | | |
| } | | |

431

FIG. 24

| | Syntax | No. of bits | Mnemonic |
|---|---|---|---|
| | indexExtensionData(){ | | |
| | type__indicator | 8*4 | uimsbf |
| | reserved | 8*4 | bslbf |
| | TableOfPlayLists__start__address | 32 | uimsbf |
| | MakersPrivateData__start__address | 32 | uimsbf |
| | reserved__for__future__use | 192 | bslbf |
| 451 | UIAppinfoAVCHD() | | |
| | for (i=0;i<N1;i++){ | | |
| | padding__word | 16 | bslbf |
| | } | | |
| 452 | TableOfPlayLists() | | |
| | for (i=0;i<N2;i++){ | | |
| | padding__word | 16 | bslbf |
| | } | | |
| 453 | MakersPrivateData() | | |
| | for (i=0;i<N3;i++){ | | |
| | padding__word | 16 | bslbf |
| | } | | |
| | } | | |

FIG. 25

| Syntax | | No. of bits | Mnemonic |
|---|---|---|---|
| UIAppInfoAVCHD() { | | | |
| length | | 32 | uimsbf |
| maker_ID | < XXXX (REPRESENTING MAKER) > | 16 | uimsbf |
| maker_model_code | < XXXX (REPRESENTING APPARATUS) > | 16 | uimsbf |
| maker_private_area | <ALL0> | 8*32 | bslbf |
| reserved_for_future_use | | 15 | bslbf |
| AVCHD_write_protect_flag | <0> | 1 | bslbf |
| ref_to_menu_thumbnail_index | <0xFFFF> | 16 | uimsbf |
| time_zone | < LAST UPDATE TIME > | 8 | bslbf |
| record_time_and_date | < LAST UPDATE TIME > | 4*14 | bslbf |
| reserved_for_future_use | | 8 | bslbf |
| AVCHD_character_set | <0x90> | 8 | bslbf |
| AVCHD_name_length | <0> | 8 | uimsbf |
| AVCHD_name | <ALL0> | 8*255 | bslbf |
| Additional_data() { | | | |
| length2 | | 32 | uimsbf |
| reserved_for_future_use | | length2 | bslbf |
| } | | | |
| } | | | |

FIG. 26

| Syntax | No. of bits | Mnemonic |
|---|---|---|
| TableOfPlayLists() { | | |
| length | 32 | uimsbf |
| FirstPlayback_PlayLists() < INCREMENT BY 1 > | | |
| TopMenu_PlayLists() | | |
| number_of_Title_PlayList_pair | 16 | bslbf |
| for (i=0;i<number_of_Title_PlayList_pair++) { | | |
| Title_PlayList_pair | | |
| PlayList_file_name < PLAYLIST FILE NUMBER > | 8*5 | bslbf |
| reserved_for_future_use | 6 | bslbf |
| PlayList_attribute <2> | 2 | uimsbf |
| reserved_for_future_use | 14 | bslbf |
| ref_to_title_id | 16 | uimsbf |
| } | | |
| } | | |

471 (FirstPlayback_PlayLists(), TopMenu_PlayLists())

FIG. 27

| Syntax | No. of bits | Mnemonic |
| --- | --- | --- |
| FirstPlayback__PlayLists/TopMenu__PlayLists(){ | | |
| Length | 32 | uimsbf |
| number__of__PLayLists <0> | 16 | uimsbf |
| for (i=0;i<number__of__PlayLists++){ | | |
| PlayList__file__name | 8*5 | bslbf |
| reserved__for__future__use | 8 | bslbf |
| } | | |
| } | | |

FIG. 28

| Syntax | No. of bits | Mnemonic |
|---|---|---|
| MakersPrivateData() { | | |
| length <0> | 32 | uimsbf |
| if(length != 0) { | | |
| data__block__start__address | 32 | uimsbf |
| reserved__for__word__align | 24 | bslbf |
| number__of__maker__entries | 8 | uimsbf |
| for (i=0;i<number__of__maker__entries;i++) { | | |
| maker__ID | 16 | uimsbf |
| maker__model__code | 16 | uimsbf |
| mpd__start__address | 32 | uimsbf |
| mpd__length | 32 | uimsbf |
| } | | |
| for (i=0<;i<L1;i++) { | | |
| padding__word | 16 | bslbf |
| padding__word | 16 | bslbf |
| } | | |
| data__block | 32+ 8 * (length− data__block__ start__address) | |
| } | | |
| } | | |

FIG. 30

| Syntax | No. of bits | Mnemonic |
|---|---|---|
| ExtensionData() { | | |
| type_indicator | 8*4 | uimsbf |
| reserved | 8*4 | bslbf |
| PlayListMarkExt_start_address | 32 | uimsbf |
| MakersPrivateData_start_address | 32 | uimsbf |
| reserved_for_future_use | 192 | bslbf |
| PlayListMeta() | | |
| for (i=0;i<N1;i++){ | | |
| padding_word | 16 | bslbf |
| } | | |
| PlayListMarkExt() | | |
| for (i=0;i<N2;i++){ | | |
| padding_word | 16 | bslbf |
| } | | |
| 481 MakersPrivateData() | | |
| for (i=0;i<N3;i++){ | | |
| padding_word | 16 | bslbf |
| } | | |
| } | | |

FIG. 31

| Syntax | No. of bits | Mnemonic |
|---|---|---|
| MakersPrivateData(){ | | |
| length | 32 | uimsbf |
| if(length ! =0){ | | |
| data__block__start__address | 32 | uimsbf |
| reserved__for__word__align | 24 | bslbf |
| number__of__maker__entries | 8 | uimsbf |
| for (i=0;i<number__of__maker__entries;i++){ | | |
| maker__ID | 16 | uimsbf |
| maker__model__code | 16 | uimsbf |
| mpd__start__address | 32 | uimsbf |
| mpd__length | 32 | uimsbf |
| } | | |
| for (i=0<;i<L1;i++){ | | |
| padding__word | 16 | bslbf |
| padding__word | 16 | bslbf |
| } | | |
| 482 data__block | 32+ 8 * (length− data__block__ start__address) | |
| } | | |
| } | | |

APPARATUS, METHOD, AND COMPUTER PROGRAM FOR PROCESSING INFORMATION

CROSS-REFERENCE TO RELATED APPLICATIONS

The present application claims priority from Japanese Patent Application No. JP 2006-173751, filed in the Japanese Patent Office on Jun. 23, 2006, the entire content of which is incorporated herein by reference.

BACKGROUND OF THE INVENTION

1. Field of the Invention

The present invention relates to an information processing apparatus, an information processing method and a computer program for producing a photo movie as moving image data generated based on a still image. More specifically, the present invention relates to an information processing apparatus, an information processing method and a computer program for producing a photo movie during a finalize process or a content editing process.

2. Description of the Related Art

As the recording capacity of disk-type recording media increases, video cameras storing moving images or still images on a disk instead of the known recording tape are commercially available. Since the disk-type recording medium is used in a random-access fashion, any desired scene can be efficiently found from recorded data. Since the disk-type recording medium operates in a non-contact fashion, data accessing to the disk is performed in a manner free from physical wear. For example, digital versatile disk (DVD) video cameras are in widespread use because of the user friendliness thereof such as high image quality and ease of editing.

Many of video cameras record not only moving images but also still images. A moving image and a still image, recorded on a video camera, are recorded on an information recording medium of the video camera as separate files. The information recording media include a digital versatile disk (DVD) and a flash memory.

The moving images and still images, recorded on the information recording medium, can be reproduced on a reproducing apparatus such as a personal computer. The still images may be reproduced in a slide show fashion in which a plurality of still images successively switched or may be reproduced as a moving image by producing a moving image file (for example, a MPEG file) based on the plurality of still images, namely, a photo movie. Japanese Unexamined Patent Application Publications Nos. 10-200843 and 2005-303908 disclose the photo movie. To reproduce the still images on an reproducing apparatus that runs only a moving image reproducing program, the still image needs to be in a photo movie based format.

When the still image is recorded on the information recording medium in a recording apparatus such as a video camera, a photo movie production process is performed at a given stage based on the still image recorded on the information recording medium. The photo movie production process is performed in a finalize process that sets the information recording medium to an additional storage disabled state.

When still image data is converted into a moving image format, an attribute information storage file corresponding to the moving image format is set. Depending on the format, there are limitations on the number and size of permitted attribute information storage files. If the upper limitation is reached before the finalize process, the attribute information storage file corresponding to the photo movie cannot be produced.

After the finalize process is performed on the video camera that has recorded data, a user may desire to cancel the finalize process to reproduce the data. In view of the recording of a new image, a photo movie produced at the finalize process is preferably deleted, and a photo movie is preferably produced with the additionally stored new image accounted for. To perform this process, the deletion process needs to be performed after determining whether the file is a photo movie. It is difficult for known apparatuses to efficiently identify the file.

SUMMARY OF THE INVENTION

It is thus desirable to provide an information processing apparatus, an information processing method, and a computer program for recording still images on an information recording medium, performing a photo movie production process based on the recorded still images in a manner free from a resource inefficiency, and deleting a photo movie by immediately and reliably identifying the photo movie at finalize process cancellation.

In accordance with one embodiment of the present invention, an information processing apparatus includes an encoding and decoding unit for performing a data conversion process by decoding encoded still image data acquired from an information recording medium and generating moving image encoded data based on the decoded still image data, a medium control unit for performing a data re-recording process by recording the moving image encoded data, generated by the encoding and decoding unit, on the information recording medium in a predetermined data recording format, and a controller for controlling the data conversion process of the encoding and decoding unit and the data re-recording process of the medium control unit. The controller controls the data conversion process and the data re-recording process in response to user input information as to whether to execute the data conversion process.

Preferably, the controller inquires a user of whether to execute the data conversion process in a transition of the information recording medium to an additional storage disabled state or in an editing of content recorded on the information recording medium, and starts the data conversion process and the data re-recording process in response to the user input information requesting the execution of the data conversion process.

The information processing apparatus may further include a storage unit storing resource information relating to a resource that is required to convert the still image data recorded on the information recording medium into the moving image encoded data and record the moving image encoded data onto the information recording medium, wherein the controller references the resource information prior to the recording of new data onto the information recording medium or the editing of the content recorded on the information recording medium, and stops the recording of the new data or the editing of the content if the recording of the new data or the editing of the content can cause the resource to be lost.

The resource may include an information storage file defined by the data recording format to the information recording medium.

The resource may include a storage capacity of the information recording medium storing information defined by the data recording format to the information recording medium.

Preferably, the controller records, in an attribute information storage file, identification data indicating that the attribute information storage file corresponds to the moving image encoded data formed based on the still image data when the data conversion process and the data re-recording process are performed.

When an additional storage disabled state is canceled in the information recording medium, the controller may detect the attribute information storage file corresponding to the moving image encoded data based on the identification data, and then delete content corresponding to the moving image encoded data and information incidental to the content.

The data recording format may be an AVCHD format.

In accordance with one embodiment of the present invention, an information processing method for recording content on an information recording medium, includes steps of performing a data conversion process by decoding encoded still image data acquired from an information recording medium and generating moving image encoded data based on the decoded still image data, performing a data re-recording process by recording the moving image encoded data on the information recording medium in a predetermined data recording format, and controlling the data conversion process and the data re-recording process, the controlling step including controlling the data conversion process and the data re-recording in response to user input information as to whether to execute the data conversion process.

The controlling step may include inquiring a user of whether to execute the data conversion process in a transition of the information recording medium to an additional storage disabled state, or in the editing of content recorded on the information recording medium, and starting the data conversion process and the data re-recording process in response to the user input information requesting the execution of the data conversion process.

The information processing method may further include storing resource information relating to a resource that is required to convert the still image data recorded on the information recording medium into the moving image encoded data and record the moving image encoded data onto the information recording medium, wherein the controlling step includes referencing the resource information prior to the recording of new data onto the information recording medium or the editing of the content recorded on the information recording medium, and stopping the recording of the new data or the editing of the content if the recording of the new data or the editing of the content can cause the resource to be lost.

The resource may include an information storage file defined by the data recording format to the information recording medium.

The resource may include a storage capacity of the information recording medium storing information defined by the data recording format to the information recording medium.

The controlling step may include recording, in an attribute information storage file, identification data indicating that the attribute information storage file corresponds to the moving image encoded data formed based on the still image data, when the data conversion process and the data re-recording process are performed.

The controlling step may include detecting the attribute information storage file corresponding to the moving image encoded data based on the identification data, and then deleting content corresponding to the moving image encoded data and information incidental to the content when an additional storage disabled state is canceled in the information recording medium.

The data recording format may be an AVCHD format.

In accordance with one embodiment of the present invention, a computer program for causing an information processing apparatus to record content on an information recording medium, includes steps of performing a data conversion process by decoding encoded still image data acquired from an information recording medium and generating moving image encoded data based on the decoded still image data, performing a data re-recording process by recording the moving image encoded data on the information recording medium in a predetermined data recording format, and controlling the data conversion process and the data re-recording process, the controlling step including controlling the data conversion process and the data re-recording in response to user input information as to whether to execute the data conversion process.

The computer program of one embodiment of the present invention may be supplied, to a computer system performing a variety of program code, in a computer readable format in a recording medium such as a compact disk (CD), a floppy disk (FD), and a magneto-optical (MO) disk, or via a communication medium such as a network. With the program provided in the computer readable format, the computer system performs a process responsive to the computer program.

Theses and other features and advantages of the present invention will be apparent from the following description, and the accompanying drawings. The word "system" in the context of this specification refers to a logical set of a plurality of apparatuses and is not limited to a single casing containing a plurality of apparatuses.

In accordance with embodiments of the present invention, the information processing apparatus such as a video camera decodes the encoded still image data acquired from the information recording medium, and produces and records the photo movie in the data recording format such as AVCHD by producing the moving image data based on the decoded still image data. During the finalize process performed as a transition process to the additional storage disabled state of the information recording medium or the editing process of the recorded content, the information processing apparatus detects the user input information indicating whether to execute the photo movie, and produces the photo movie at any timing desired by the user. Since an identifier is set in a play list relating to the photo movie, the information processing apparatus efficiently extracts and deletes photo movie related data. The information processing apparatus can quickly cancel the finalize process, namely, can quickly perform an unfinalize process.

BRIEF DESCRIPTION OF THE DRAWINGS

FIG. 12 illustrates a syntax of a play list file in accordance with one embodiment of the present invention;

FIG. 13 illustrates a syntax of a play list block in the play list file in accordance with one embodiment of the present invention;

FIG. 14 illustrates a syntax of play item information of the play list block in the play list file in accordance with one embodiment of the present invention;

FIG. 15 illustrates a syntax of a clip information file in accordance with one embodiment of the present invention;

FIG. 16 illustrates a syntax of a clip information block in the clip information file in accordance with one embodiment of the present invention;

FIG. 17 illustrates a syntax of a sequence information block of the clip information file in accordance with one embodiment of the present invention;

FIG. 18 illustrates a syntax of a program information block in the clip information file in accordance with one embodiment of the present invention;

FIG. 19 illustrates a syntax of a movie object file in accordance with one embodiment of the present invention;

FIG. 20 illustrates a syntax of a movie object block in a movie object file in accordance with one embodiment of the present invention;

FIG. 21 illustrates a syntax of an index file in accordance with one embodiment of the present invention;

FIG. 22 illustrates a syntax of an index information block in an index file in accordance with one embodiment of the present invention;

FIG. 23 illustrates a syntax of an extension information block in the index file in accordance with one embodiment of the present invention;

FIG. 24 illustrates the structure of data of the extension information block in the index file in accordance with one embodiment of the present invention;

FIG. 25 illustrates data of the extension information block in the index file in accordance with one embodiment of the present invention;

FIG. 26 illustrates data of the extension information block in the index file in accordance with one embodiment of the present invention;

FIG. 27 illustrates data of the extension information block in the index file in accordance with one embodiment of the present invention;

FIG. 28 illustrates data of maker private data of the extension information block in the index file in accordance with one embodiment of the present invention;

FIG. 30 illustrates extension data in the play list with the photo movie identification mark recorded in the play list in accordance with one embodiment of the present invention; and FIG. 31 illustrates recorded data of the extension data in the play list with the photo movie identification mark recorded in the play list in accordance with one embodiment of the present invention.

DESCRIPTION OF THE PREFERRED EMBODIMENTS

An information processing apparatus 100, an information processing method and a computer program in accordance with embodiments of the present invention are described below with reference to the drawings.

Figure 1:
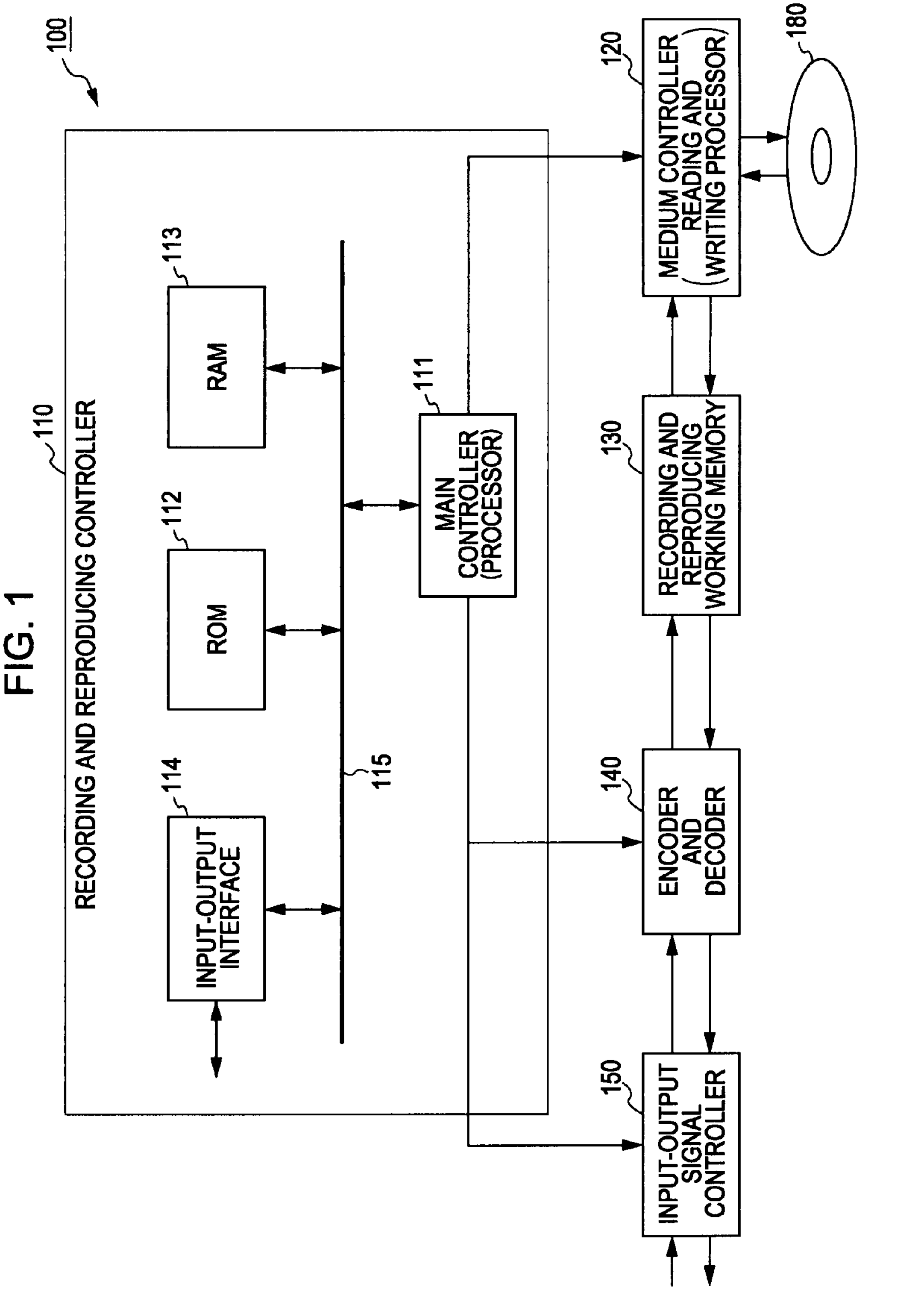
FIG. 1 is a block diagram illustrating an information processing apparatus in accordance with one embodiment of the present invention.

FIG. 1 is a block diagram illustrating the information processing apparatus 100 in accordance with one embodiment of the present invention. The information processing apparatus 100 of FIG. 1 is a video camera. As shown, the information processing apparatus 100 includes a recording and reproducing controller 110, a medium controller (reading and writing processor) 120, a recording and reproducing working memory 130, an encoder and decoder 140 and an input-output signal controller 150. The recording and reproducing controller 110 includes a main controller (processor) 111, a read-only memory (ROM) 112, a random-access memory (RAM) 113, and an input-output interface 114.

The information processing apparatus 100 is designed to record and reproduce a moving image and a still image using an information recording medium 180. The information processing apparatus 100 can generate a file in a moving image format such as AVCHD format (MPEG-4 part 10 Advanced Video Coding (AVC)/H.264), namely, a photo movie based on the still image recorded on the information recording medium 180, and then re-record the photo movie onto the information recording medium 180. The data recording on the information recording medium 180 may be performed in accordance with the AVCHD format. The data recording in accordance with the AVCHD format will be described in detail later.

When data is recorded, the encoder and decoder 140 encodes the moving image or the still image input from the input-output signal controller 150. For example, the encoder and decoder 140 performs the encoding process on a video stream and an audio stream, composed of an input moving image signal, into a multiplexed data stream. The data encoded by the encoder and decoder 140 is stored on the recording and reproducing working memory 130 and then recorded onto the information recording medium 180 under the control of the medium controller 120.

The encoding operation performed by the encoder and decoder 140 during the data recording process becomes different between the moving image and the still image. The information recording medium 180 thus records thereon a moving image file and a still image file.

The information processing apparatus 100 reads still image data from the information recording medium 180, produces a file in a moving image format (such MPEG file) based on the read still image data, namely, the photo movie, and then re-records the photo movie onto the information recording medium 180.

The photo movie production process, summarized here, will be described in detail later. The medium controller 120 reads the still image data from the information recording medium 180, and stores the read still image data on the recording and reproducing working memory 130. The encoder and decoder 140 decodes the still image signal. The decoded data is then re-input to the encoder and decoder 140 via the input-output signal controller 150. The encoder and decoder 140 generates the (MPEG) encoded data in the moving image format, namely, the photo movie in response to the input data. The generated photo movie is stored on the recording and reproducing working memory 130 and then re-recorded on the information recording medium 180 under the control of the medium controller 120.

The recording and reproducing controller 110 controls a data recording process, a data reproducing process, and a photo movie production process performed by the information processing apparatus 100. The recording and reproducing controller 110 includes a main controller 111, a read-only memory (ROM) 112, a random-access memory (RAM) 113, an input-output interface 114 and a bus 115 used to interconnect these elements.

The main controller 111 issues to the encoder and decoder 140 a start command and a stop command to start and stop the encoding process, respectively. The main controller 111 also issues to the medium controller 120 a data read command and a data write command to read data from and write data to the medium controller 120, respectively. The main controller 111 controls a capturing operation of capturing an input signal from the encoder and decoder 140 and an output operation to output a captured input signal to the encoder and decoder 140. These operations are performed in a production process of the photo movie based on the still image data. More specifically, during the production process of the photo movie, the encoder and decoder 140 decodes the still image data recorded on the information recording medium 180, outputs the decoding process result to the input-output signal controller 150 and then inputs again the still image data from the input-output signal controller 150 to the encoder and decoder 140. The still image data is encoded into the data in the MPEG moving image format, namely, the photo movie.

The ROM 112 in the recording and reproducing controller 110 stores a program executed by the main controller 111 and a variety of parameters. The ROM 112 may include an electronically erasable and programmable read-only memory (EEPROM) such as a flash memory. The RAM 113 stores work data required for the main controller 111 to execute the program, and may include one of a static random-access memory (SRAM) and a dynamic random-access memory (DRAM). The input-output interface 114 is connected to a user input unit, a display, or a network and exchanges data and commands with an external device. The input-output interface 114 is used to update the program stored on the ROM 112, for example.

Figure 2:
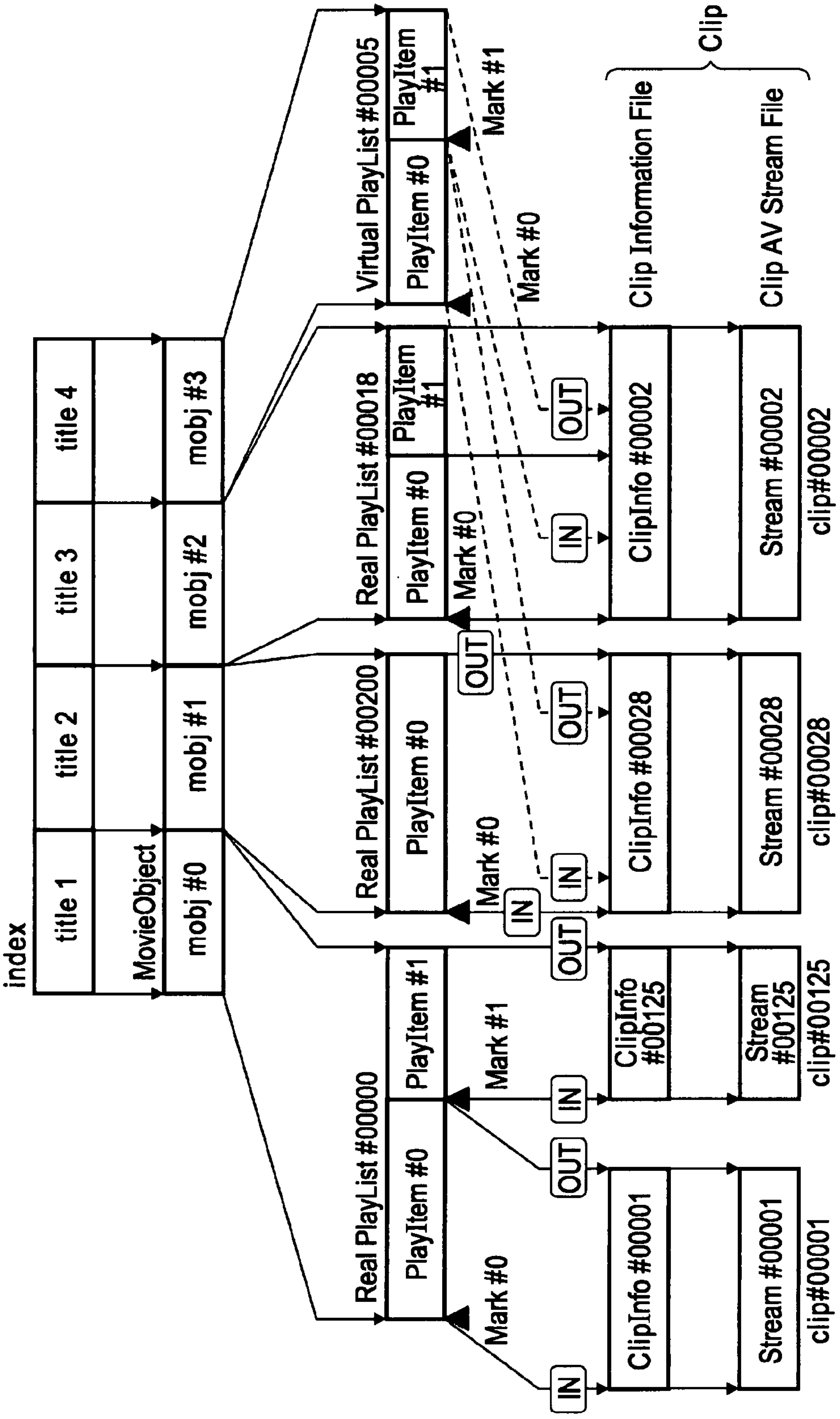
FIG. 2 illustrates a data structure of data recorded on an information recording medium in accordance with one embodiment of the present invention.

FIG. 2 illustrates a data structure of data stored on the information recording medium 180. The data structure to be discussed herein complies with the AVCHD format. As shown in FIG. 2, a moving image stream photographed by the video camera is encoded into an MPEG2-TS stream for recording. Generated and recorded in this case include an index file, a movie object (MovieObject) file, a play list (PlayList) file, a clip information (ClipInformation) file, and a clip AV stream (ClipAVStream) file. Clip information files corresponding to the ClipAVStream of a predetermined data unit are collectively referred to as a clip.

The files are listed below and described in detail.

Index file: Maximum number of index files is one. Function of the index file is as follows: The index file is a root file used to manage the entire medium. The index file manages correspondence between a title shown to a user and a Movieobject file. In accordance with the AVCHD format, the play order of the play lists to be managed by the MovieObject is managed in metadata of the index file.

MovieObject file: Maximum number of MovieObject files is one. Function of the MovieObject file is as follows: the MovieObject file is used to manage the play list that is reproduced when a title is specified in accordance with the BD-ROM format. In accordance with the AVCHD format, the metadata in the index file is used to manage a relationship between the play list and the title without referencing the MovieObject file.

Real PlayList file: Maximum number of total of Real Playlist files and Virtual PlayList files are 2000. The function of the Real PlayList file is as follows: The Real PlayList is the PlayList for the original title. Video recorded and reproduced is registered in the real PlayList file in the order of recording.

Virtual PlayList file: The Virtual Playlist file is a PlayList for producing a user-defined play list through non-destructive editing. The Virtual PlayList has no clip thereof and reproduces data by specifying a clip registered in the Real PlayList file.

Clip Information: Maximum number of Clip Information files is 4000. The Clip Information file is present in pair with the ClipAVStream file, and contains information relating to a stream required for reproducing an actual stream.

Clip AV Stream file: Maximum number of Clip AV Stream files is 4000. The Clip AV Stream file contains a stream recorded in accordance with MPEG2-TS. Video data of AVC is contained in this file.

The index file manages the entire information recording medium 180 by file type layer. An index file is produced for each title shown to a user, and manages a correspondence relationship with the movie object. In accordance with the AVCHD format, the play order of the play lists to be originally managed by a movie object file is managed within the metadata of the index file. When the information recording medium is loaded on a player, the index file is first read. The user can see the title described in the index file.

The MovieObject file is used to manage the play list to be reproduced. A reference to a MovieObject file is listed in the index file as an entry point to the title. In accordance with the AVCHD format, the MovieObject file is not referenced and the relationship between the play list and the title is managed by the metadata in the index file.

The PlayList file is arranged in association with the title shown to the user and includes at least one PlayItem. Each PlayItem specifies a play period defined by a play start point (IN point) and a play end point (OUT point) of each clip. The play order of the play periods is specified by arranging a plurality of PlayItems in time axis in the PlayList. PlayItems referencing different clips may be contained in a single PlayList.

The reference relationship between the clip and the PlayList may be freely set. For example, a single clip may be referenced from two PlayLists different in the IN point and the OUT point. The reference relationship may be freely set between the title and the MovieObject. The PlayLists are divided into two major types, namely, a real PlayList and a virtual PlayList depending on the reference relationship with the clip.

The real PlayList is the one for the original title and has PlayItems of video streams, photographed and recorded by the video camera, in the order of recording.

The virtual PlayList is the one for producing a user-defined PlayList through non-destructive editing. The virtual PlayList has no clip (AV stream) thereof and the PlayItem in the virtual PlayList indicates a clip or a portion of the clip registered in any of the real PlayLists. More specifically, the user can extract a required play period from a plurality of clips and edit the PlayItems indicating the periods into a virtual PlayList.

The clipAVStream file stores a stream recorded in the MPEG-TS format on the information recording medium 180. The video data is stored in this file.

The clip information file is present in pair with the clipAVStream file and contains information relating to information required to reproduce an actual stream.

As described above, the index file, the MovieObject file, the PlayList file, the ClipInformation file, and the clipAVStream file are recorded in accordance with the AVCHD format.

The designates of these files and data are described for exemplary purposes only, and other designates may be used. The content of each file and data are described below:

(1) AV stream (ClipAVStream): Content data (2) Clip information (ClipInformation): The clip information corresponds to the AV stream on a one-to-one correspondence basis, and defines an attribute of the corresponding AV stream. For example, the ClipInformation file contains coding, size, time to address conversion, play management information, time map, etc.

(3) Play item (PlayItem): The play item contains data specifying a play period between a play start point and a play end point of the ClipInformation.

(4) Play list (PlayList): The play list contains at least one PlayItem.

(5) Mark: A mark is typically present in the PlayList and indicates time point of play content. A period from one mark to a next mark is typically referred to as a chapter.

(6) Movie object (MovieObject): MovieObject is a set of commands for controlling playing.

(7) Title: Title is a set of PlayLists (recognizable by the user).

In the discussion that follows, data and files having the above-described content are the AV stream (clipAVStream), the clip information (ClipInformation), the play item (PlayItem), the play list (PlayList), the mark, the movie object (MovieObject), and the title. The present invention is applicable to the structure having substantially the same content as described above.

Figure 3:
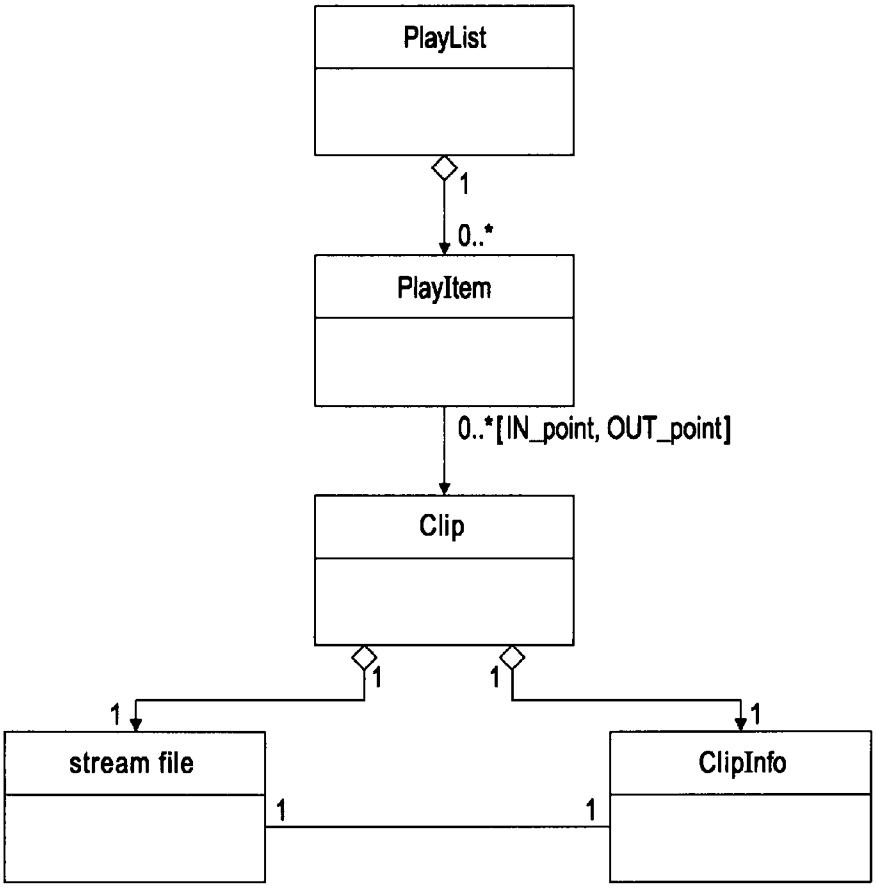
FIG. 3 illustrates a unified modeling language (UML) indicating a PlayList, PlayItem, Clip, ClipInformation, and ClipAvStrem in accordance with one embodiment of the present invention.

FIG. 3 illustrates a unified modeling language (UML) indicating the relationship of the PlayList, the PlayItem, the Clip, the ClipInformation, and the clipAVStream discussed with reference to FIG. 2. The PlayList is related to at least one PlayItem, and one PlayItem is related to one clip. A plurality of PlayItems different in the start point and/or the end point may be related to a single clip. A single clipAVStream file can be referenced from a single clip. The clipAVStream file and the ClipInformation file are related to each other on a one-to-one correspondence basis. By defining the structure in this way, a non-destructive play order may specified with any portion of the data reproduced without modifying the clipAVStream file.

Figure 4:
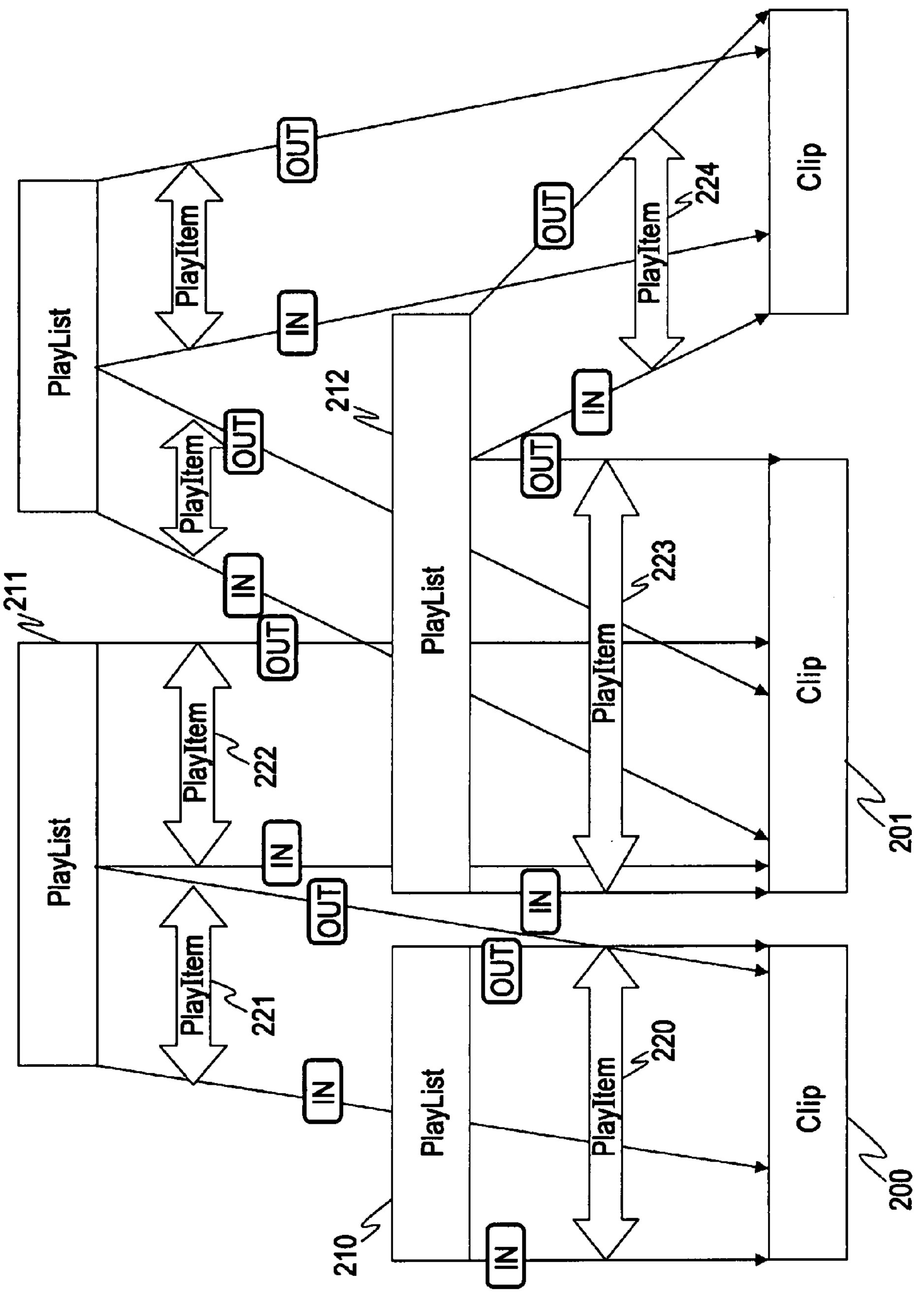
FIG. 4 illustrates a reference relationship of a play list to a clip in accordance with one embodiment of the present invention.

As shown in FIG. 4, the same clip may be referenced from a plurality of PlayLists. A single PlayList may specify a plurality of clips. The clip may be referenced by the IN point and the OUT point indicated by the PlayItem in the PlayList. As shown in FIG. 4, a clip 200 is referenced by a PlayItem 220 in a PlayList 210 while a period defined by the IN point and the OUT point of a PlayItem 221, out of the PlayItems 221 and 222 forming a PlayList 211 is referenced. In a clip 201, a period thereof defined by the IN point and the OUT point of the PlayItem 222 in the PlayList 211 is referenced, and a period thereof defined by the IN point and the OUT point of a PlayItem 223, out of PlayItems 223 and 224 in a PlayList 212 is referenced.

Figure 5:
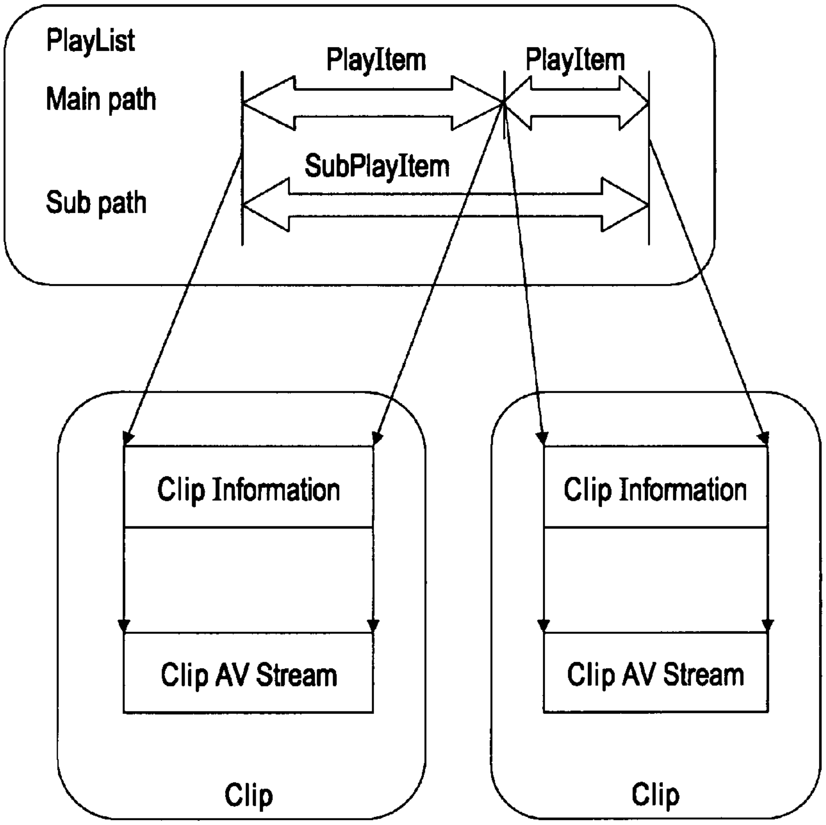
FIG. 5 illustrates a relationship of a main path and a sub path set in the play list, and the clip in accordance with one embodiment of the present invention.

As shown in FIG. 5, the PlayList may have a sub path corresponding to a sub PlayItem in a way similar to the relationship between the main path and the PlayItem to be mainly reproduced. For example, an after-recording PlayItem attached to the PlayList may be contained as a sub PlayItem in the PlayList. As will be described in detail later, the PlayList can contain a sub PlayItem only when a predetermined condition is satisfied.

Figure 6:
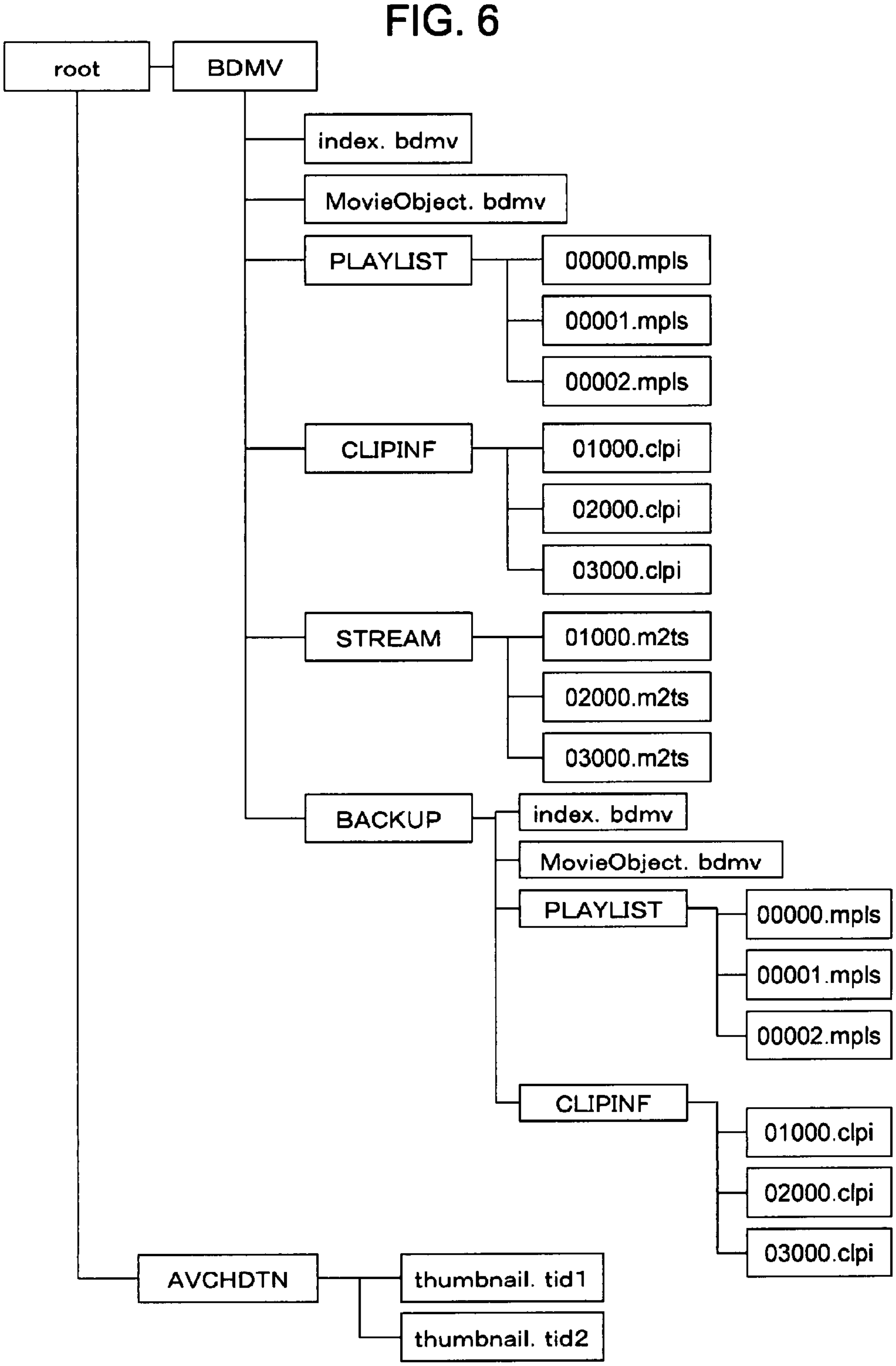
FIG. 6 illustrates a management structure of files recorded on the information recording medium in accordance with one embodiment of the present invention.
Figure 7A:
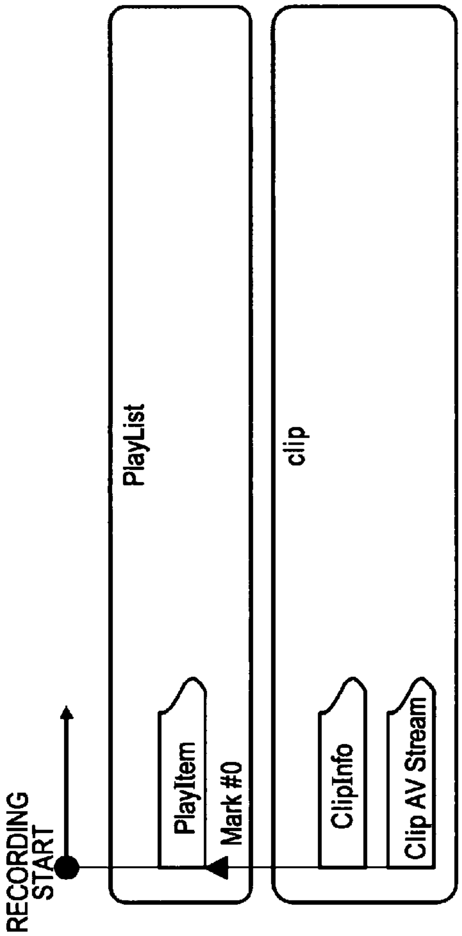
FIGS. 7A and 7B illustrate a procedure in accordance with which the play list is generated together with the clip of an audio-visual (AV) stream in step with photographing and recording operations of a video camera in accordance with one embodiment of the present invention.
Figure 7B:
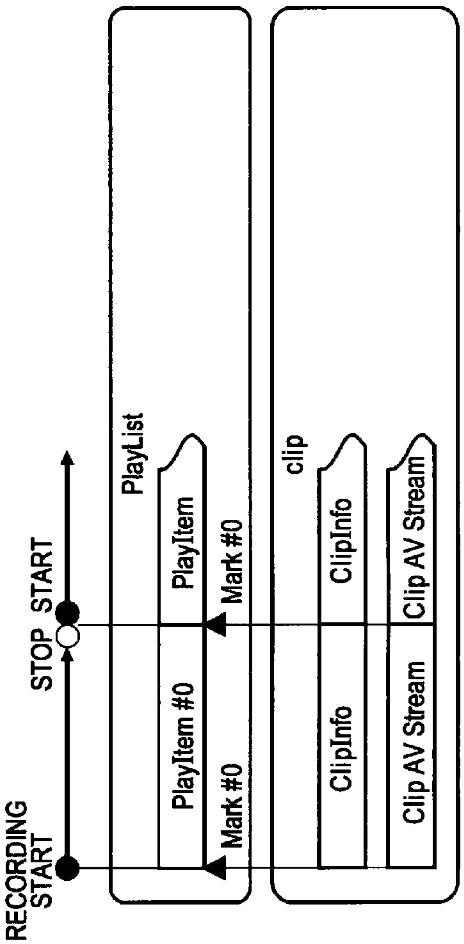
Figure 8A:
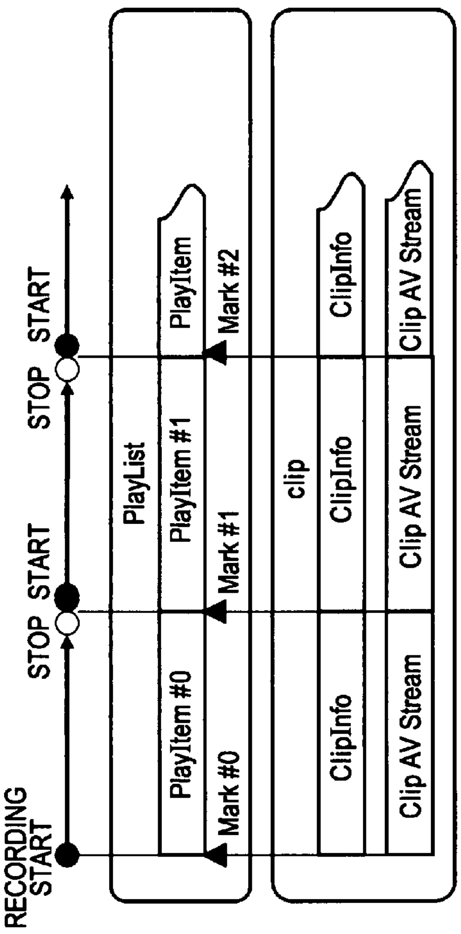
FIGS. 8A and 8B illustrate a procedure in accordance with which the play list is generated together with the clip of an AV stream in step with photographing and recording operations of the video camera in accordance with one embodiment of the present invention.
Figure 8B:
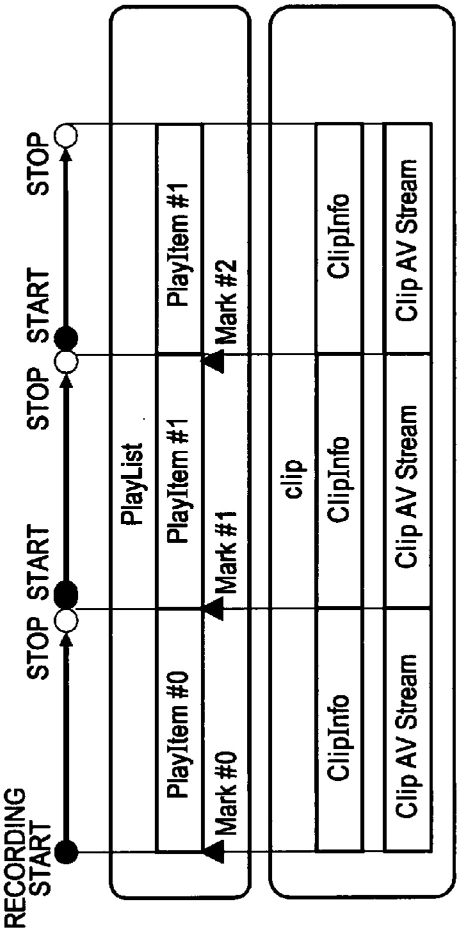

A management structure of a file to be recorded on the information recording medium 180 is described below with reference to FIG. 6. As described above with reference to FIGS. 2 through 4, the data to be recorded on the information recording medium 180 includes the MovieObject, the PlayList, and the clip. The clip includes the ClipInformation file and clipAVStream file. The files are managed by layer. One directory (a root directory in FIG. 6) is created on the information recording medium 180. The directories under the root directory are a range controlled by a single recording and reproducing system.

Arranged under the root directory are a BDMV directory and an AVCHDTN directory. A thumbnail file having a representative image of a clip contracted to a predetermined size is arranged under the AVCHDTN directory. The data structure discussed with reference to FIG. 2 is stored under the BDMV directory.

Only two files, namely, an index.bdmv file and a MovieObject.bdmv file, can be arranged under the BDMV directory. The directories arranged under the BDMV directory are a PLAYLIST directory, a CLIPINF directory, a STREAM directory, and a BACKUP directory.

The content of the BDMV directory is described in the index.bdmv file. The MovieObject.bdmv file stores information regarding at least one movie object.

The PLAYLIST directory contains a database of the PlayList. More specifically, the PLAYLIST directory contains a play list file xxxxx.mpls as a file relating to a movie play list. The play list file xxxxx.mpls is created for each of the movie play lists. In the file name, "xxxxx" preceding the period (".") is a five digit number, and "mpls" following the period is an extension fixed to this type of file.

The CLIPINF directory contains a database of each clip. More specifically, the CLIPINF directory contains a clip information file "zzzzz.clpi" corresponding to each clipAVStream file. In the file name, "zzzzz" preceding the period (".") is a five digit number, and "clpi" following the period is an extension fixed to this type of file.

The STREAM directory contains an AV stream file as a body. More specifically, the STREAM directory contains a clip AV stream file corresponding to each clip information file. The clip AV stream file contains a moving picture experts group (MPEG) 2 transport stream (hereinafter referred to as MPEG2 TS), and has a file name "zzzzz.m2ts." In the file name, "zzzzz" preceding the period is identical to that of the corresponding clip information file to allow the correspondence between the clip information file and the clip AV stream file to be easily recognized.

The AVCHDTN directory can contain two types of thumbnail files, namely, a thumbnail.tid1 file and a thumbnail.tid2 file. The thumbnail.tid1 file contains a thumbnail image encoded in accordance with a predetermined method. The thumbnail.tid2 file contains an unencoded thumbnail image. For example, a thumbnail image corresponding to a clip the user has photographed with a video camera is copy free and needs no encoding, and is thus contained in the thumbnail.tid2 file.

A generation process of generating the PlayList together with the AV stream in step with the photographing and recording of the video by the video camera is described below with reference to FIGS. 7A and 7B and FIGS. 8A and 8B.

FIGS. 7A and 7B and FIGS. 8A and 8B illustrate the generation process of the clip and the play list performed when the user starts and stops a recording process. As shown in FIGS. 7A and 7B and FIGS. 8A and 8B, one PlayItem is generated in a period from when the user starts the recording process to when the user stops the recording process. One clip AV stream file is generated in accordance with one session of the photographing and recording operation. Along with this session, the clip information file is also generated. One clip is a unit requiring reproduction under which continuous synchronized playing, namely, real-time play is guaranteed.

Each time the user starts recording, an entry mark is attached to the head of the PlayItem. The entry mark in the PlayList is referred to as a PlayList mark (PLM). Within one PlayList, PlayItems and the marks are serially numbered. Although the head of each PlayList for a moving image must be tagged with the respective entry mark, a predetermined operation can shift the entry mark in time axis.

Each entry mark represents an entry position at which the user has accessed the stream. Periods, each period delimited by adjacent entry marks (and a period from last mark to the end of the final PlayItem) are "chapters" as a minimum editing unit viewed from the user. The play order of the PlayLists is defined by arranging both the PlayItems and the entry marks in the play order.

The finalize process is described below. The finalize process may be performed in the configuration of FIG. 1 when new data recording, namely additional data storage onto the information recording medium 180 is decided not to be performed after stopping of the data recording thereon. The finalize process is thus performed to disable additional data storage. For example, when a finalize process start request is issued by the user via the input-output interface 114 of FIG. 1, the finalize process is started under the control of the recording and reproducing controller 110. Even if the finalize process is performed, a finalize canceling process can restore an additional storage enabled state on the information recording medium 180.

The finalize process is described below with reference to a flowchart of FIG. 9. In step S101, the main controller 111 determines whether a photo movie production request has been input. For example, the main controller 111 controls a display via the input-output interface 114 to display a message urging the user to input the user's decision and then determines the presence or absence of the photo movie production request. More specifically, as shown in FIG. 10A, the main controller 111 causes the display to display the message, thereby urging the user to decide whether to produce the photo movie. FIG. 10A illustrates a display screen for the start request for the finalize process. If the presence or absence of the photo movie is input on this screen, the display shifts to the screen of FIG. 10B. The user can thus instruct the apparatus whether to produce the photo movie.

Figure 9:
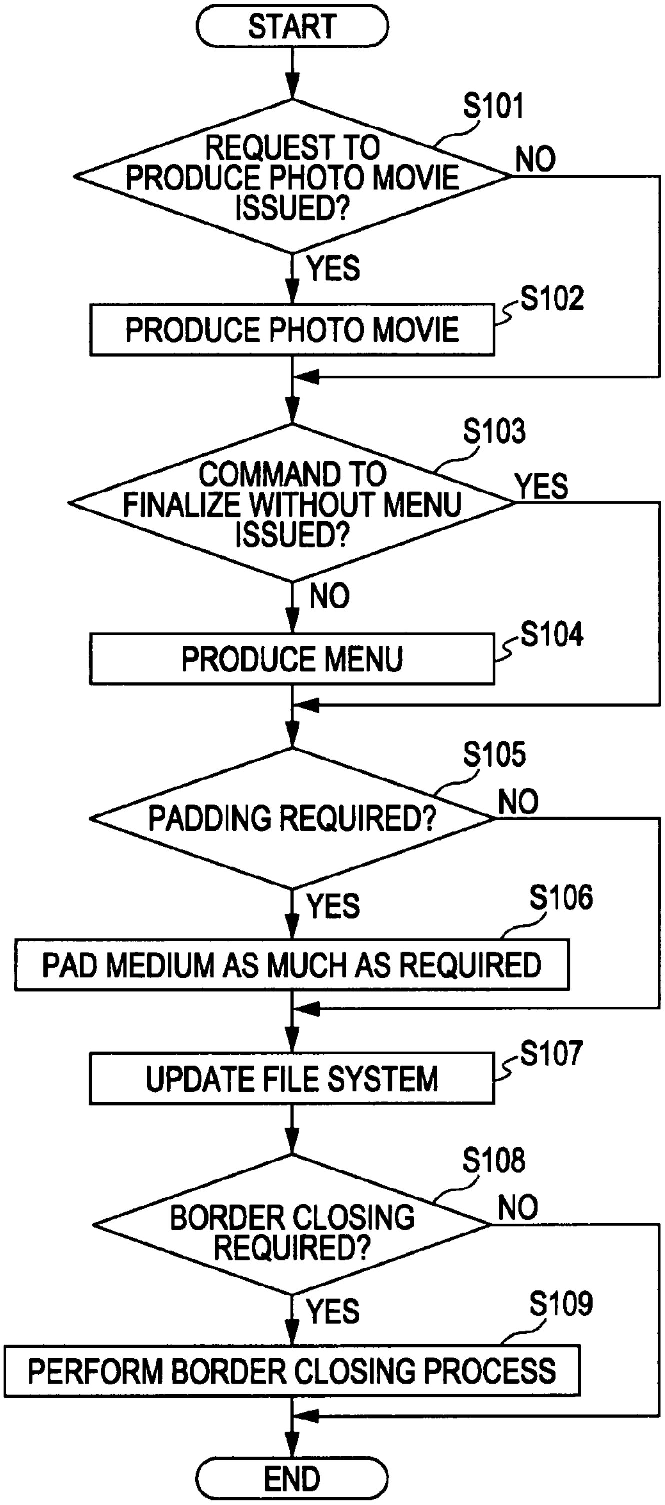
FIG. 9 is a flowchart illustrating a sequence of a finalize process in accordance with one embodiment of the present invention.
Figure 10A:
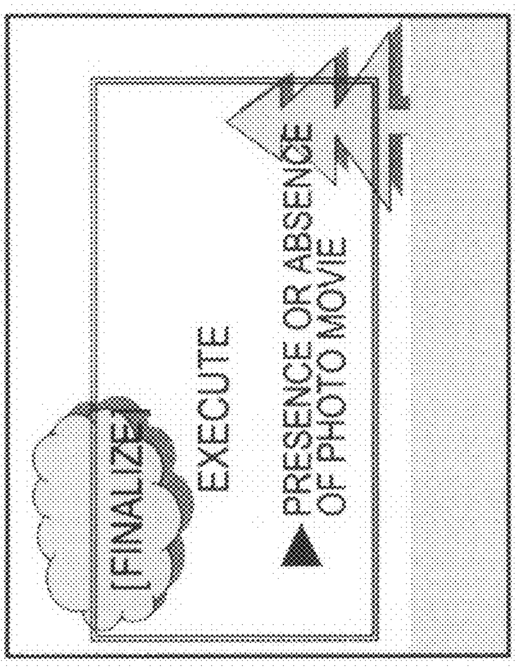
FIGS. 10A and 10B illustrate an example of user interface (UI) for inputting a photo movie production command in accordance with one embodiment of the present invention.

Returning the flowchart of FIG. 9, the discussion of the finalize process continues. If it is determined in step S101 that the production request for the photo movie has been issued, the production process of the photo movie is performed in step S102. The production process of the photo movie will be described in detail later.

In step S103, the main controller 111 determines whether the request to perform the finalize process without menu has been issued. The finalize process is performed with or without menu.

Figure 10B:
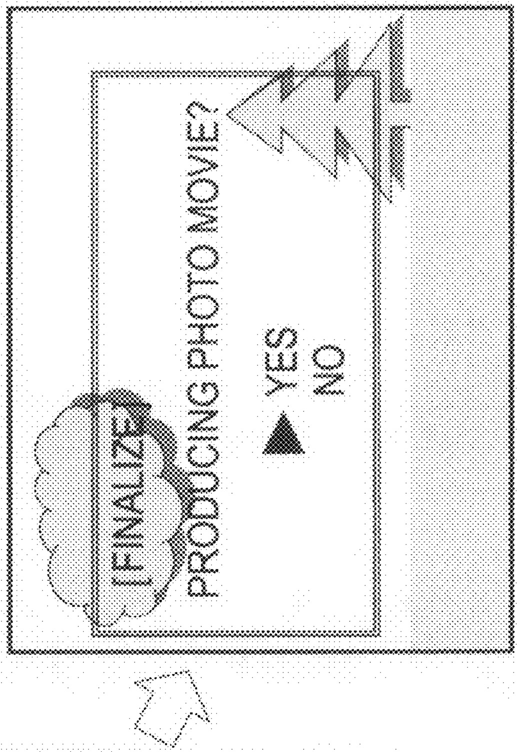

The menu is displayed on an opening screen during the playing of the information recording medium 180, and includes titles of content files and representative images of moving images stored on the information recording medium 180. During the finalize process, the user can specify whether to produce the menu. For example, in a manner similar to the one as shown in FIGS. 10A and 10B, data specifying the presence or absence of the menu is displayed on the display and the menu production is performed in response to an input from the user.

If it is determined in step S103 that the finalize process without menu is not requested, processing proceeds to step S104 to perform the menu production process. In step S105, the main controller 111 determines whether to perform a padding process. The padding process is performed to write dummy data onto a data unrecorded area of the information recording medium 180 such as a disk. Depending on design, some apparatuses for playing a disk cannot reproduce data if a remaining data recording area of the disk becomes small. To avoid such a problem, the padding process is performed to write the dummy data onto the data unrecorded area of the disk. The status of the recording area of the information recording medium 180 is detected, and if a data unrecorded area is large, the main controller 111 determines that the padding process needs to be performed. In step S106, the padding process is performed.

In step S107, the file system is updated. The update process of the file system is performed to update management information in response to data recorded on the information recording medium 180. In step S108, the main controller 111 determines whether a border closing process is required or not. The border closing process is performed on the information recording medium 180 to make recognizable lead-in and lead-out points indicating a data recording area on the disk. Whether to perform the border closing process is determined based on the type of each information recording medium 180. If it is determined that the border closing process is required, the border closing process is performed in step S109.

In this way, the finalize process is performed. Through the finalize process, the additional storage to the information recording medium is inhibited. As previously discussed, even if the finalize process is performed, the finalize cancel operation can be performed to cancel the finalized state. The finalize cancel operation can restore the information recording medium 180 to an additional storage enabled state.

The photo movie production process is described below. The photo movie production process is performed to read the still image data recorded on the information recording medium, encode the read still image data in the moving image format, and then re-write the encoded moving image data onto the information recording medium. The photo movie production process is performed in the above-described finalize process. The photo movie production process can be performed at a timing different from the execution timing of the finalize process. For example, the photo movie production process can be performed as a data editing process. When the user enters a photo movie production request via the input-output interface 114 of FIG. 1, the photo movie production process is started under the control of the recording and reproducing controller 110.

The information processing apparatus of one embodiment of the present invention reserves a resource for the photo movie production so that the photo movie production may be performed on the still image recorded on the information recording medium without insufficient resource. The resources to be preserved for the photo movie production are listed in the following table.

TABLE

| Resources | Number of preserved resources | Maximum value |
|---|---|---|
| Number of titles in index.bdmv (number_of_Titles) | 1 | 999 |
| Number of PlayLists in index.bdmv (number_of_Title_PlayList_Pair) | 1 | 2000 |
| File size of index.bdmv [Bytes] | 12 + 10 | 100 × 1024 |
| Number of objects in MovieObject.bdmv (number_of_mobjs) | 1 | 1001 |
| File size of MovieObject.bdmv [Bytes] | 14 | 600 × 1024 |
| Number of PlayLists on medium | 1 | 2000 |
| Number of clip information files on medium | 1 | 4000 |
| Remaining recording capacity on medium | Number of still images by I Picture size | Depending on medium |

As listed in the above Table, the resources reserved to allow the photo movie to be produced include the number of titles in the index.bdmv file, the number of PlayLists, the number of objects in the MovieObject.bdmv file, the file size of the index.bdmv file, the number of PlayList files on the information recording medium, the file size of the MovieObject.bdmv file, the number of clip information files, and the remaining recording capacity on the information recording medium. The resource reservation process is performed under the control of the main controller 111 in the recording and reproducing controller 110 of FIG. 1. For example, information relating to the resources to be reserved listed in the above table is stored on the ROM 112. The main controller 111 references the resource information during the new data recording process or the data edition process. Upon determining that a resource to be reserved can be lost by one of the new data recording process and the data editing process, the main controller 111 stops the process and displays a warming message.

Figure 11:
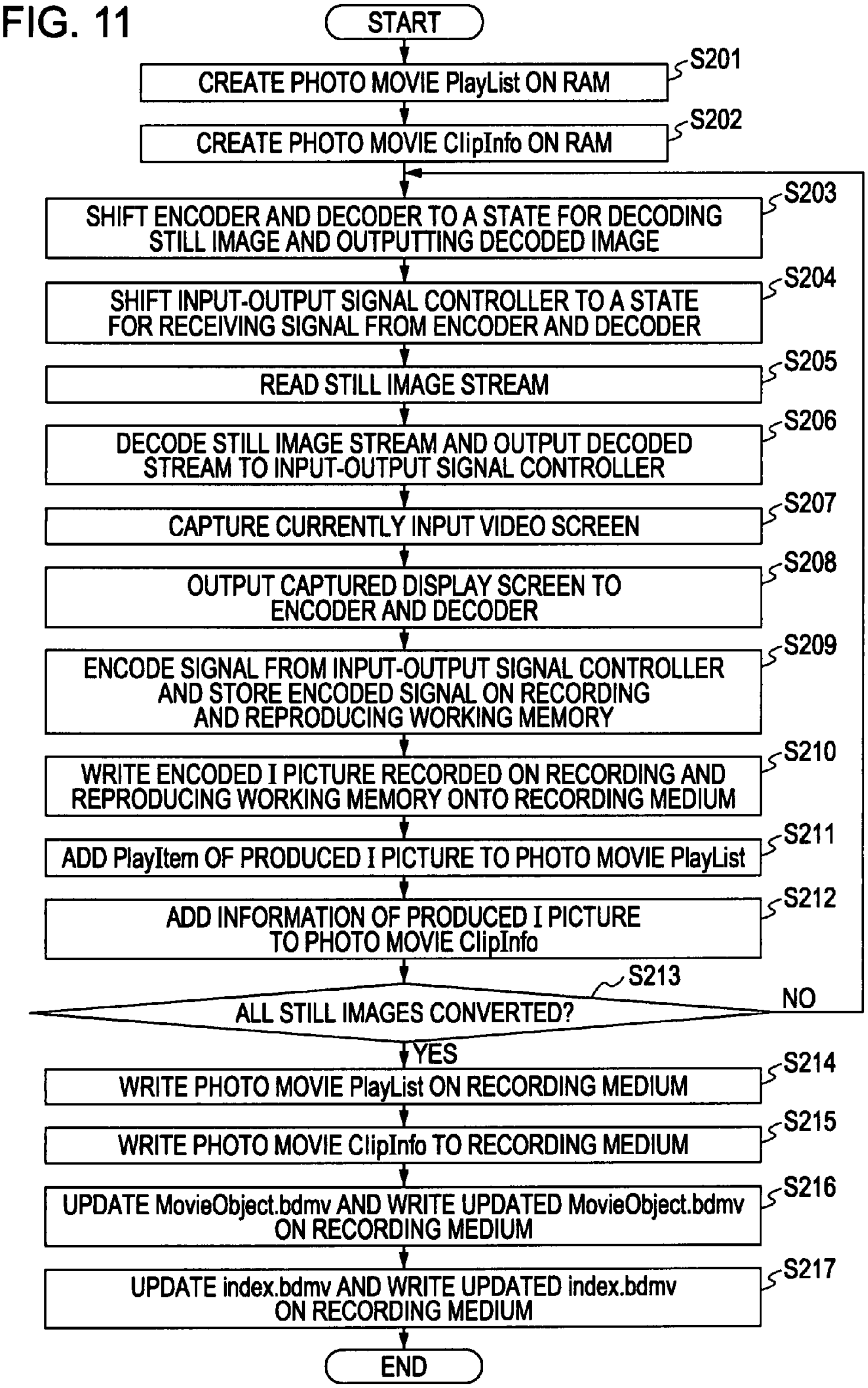
FIG. 11 is a flowchart illustrating a sequence of a photo movie production process in accordance with one embodiment of the present invention.

The sequence of the photo movie production is described below with reference to a flowchart of FIG. 11. In step S201, the PlayList of the photo movie is produced on the RAM 113. The PlayList is the one discussed with reference to the data format illustrated in FIG. 2 and corresponds to the content as the AV stream. The PlayList corresponding to the photo movie is generated on the RAM 113.

In step S202, the clip information for the photo movie is produced on the RAM 113. As previously discussed, the clip information is a file defining the attribute of the AV stream. The clip information as an attribute defining file corresponding to the photo movie is produced on the RAM 113.

In step S203, the recording and reproducing controller 110 shifts the encoder and decoder 140 of FIG. 1 to a state to be ready to decode the still image and output outward the decoded still image. In step S204, the recording and reproducing controller 110 shifts the input-output signal controller 150 to a state to be ready to receive the signal from the encoder and decoder 140. In step S205, the recording and reproducing controller 110 reads a stream of still image recorded on the information recording medium 180 via the medium controller 120.

In step S206, the recording and reproducing controller 110 decodes the still image stream, read from the information recording medium 180, with the encoder and decoder 140, and then outputs the decoded still image stream to the input-output signal controller 150. The input-output signal controller 150 captures the input still image in step S207 and outputs the captured still image to the encoder and decoder 140 in step S208.

In step S209, the encoder and decoder 140 produces a stream corresponding to the photo movie by performing the encoding process to encode the still image input from the input-output signal controller 150 into encoded data in a moving image format (such as MPEG format), and then stores the produced stream onto the recording and reproducing working memory 130.

In step S210, the medium controller 120 records on the information recording medium 180 an I picture from the encoded data recorded on the recording and reproducing working memory 130. The I pictures are components of the I picture, a P picture, and a B picture forming MPEG data, and thus important pictures in the MPEG encoded data.

In step S211, the recording and reproducing controller 110 adds to the PlayList for the photo movie the PlayItems corresponding to the number of I pictures generated in the encoding process. More specifically, in the PlayList of the photo movie, a PlayItem is set for each I picture forming the photo movie.

In step S212, the information regarding each I picture produced in the encoding process is added to the clip information for the photo movie. The clip information is a file defining the attribute of the AV stream. For example, the clip information contains coding, size, time to address conversion, play management information, time map, etc. These pieces of information are produced for each I picture and recorded in the clip information.

In step S213, the recording and reproducing controller 110 determines whether the photo movie production process has been completed on all still images recorded on the information recording medium 180. If it is determined in step S213 that the photo movie production process has not been completed, processing returns to step S203 to perform step S203 and subsequent steps on unprocessed data. If it is determined in step S213 that the photo movie production process has been completed on all still images recorded on the information recording medium 180, processing proceeds to step S214. The photo movie PlayList produced on the RAM 113 is recorded on the information recording medium 180.

In step S215, the photo movie clip information produced on the RAM 113 is written onto the information recording medium 180. In step S216, an update process is performed to record information corresponding to the produced photo movie in the movie object file. The movie object file is a set of commands for performing play control. The update process is thus performed to record a command responsive to a newly produced photo movie in the movie object on the information recording medium 180. In step S217, in the index file, information responsive to the photo movie is updated and written on the information recording medium 180.

The photo movie is thus produced, and then recorded onto the information recording medium 180.

The data update process is described below with reference to syntaxes illustrated in FIG. 12 and other figures. The data update process is described in the following operations:

(a) PlayItem addition process to the photo movie PlayList;

(b) Information addition process to the photo movie clip information;

(c) Movie object update process;

(d) Index update process.

(a) PlayItem Addition Process to the Photo Movie PlayList

PlayItem addition process to the photo movie PlayList to be performed in the photo movie production is specifically described below. The PlayItem addition process corresponds to step S211 in the flowchart of FIG. 11.

FIG. 12 illustrates a syntax of one PlayList file. As shown, the syntax here is described in C language used as a programming language of computers. The same is true of other syntaxes to be discussed later.

As shown in FIG. 12, the PlayList file includes the type information "TypeIndicator" followed by start address information of actual data "PlayListStartAddress" through "ExtensionStartAddress", and recording fields of the actual data "blkApplicationPlayList( )" through "blkExtensionData( )".

FIG. 13 illustrates a syntax of one entry of a play list information block "blkPlayList( )" 300 of FIG. 12. Information regarding the PlayItem set in the PlayList is recorded in the play list information block "PlayList( )" 300. As previously discussed with reference to FIG. 5, the PlayItem can have a sub path to a sub PlayItem as opposed to a main path to a PlayItem as a main portion to be reproduced. The play item information "blkPlayItem( )" to the main path and the sub path information "blkSubPath" to the sub path are recorded in the play list information block "PlayList( )" 300.

In step S211 discussed with reference to FIG. 11, the PlayItem addition process to the photo movie PlayList executed in the photo movie production is performed. "+1" is set on a per I picture basis of the photo movie in the data item "NumberofPlayItems" 301 of the PlayList file of FIG. 13, namely, the number of PlayItems setting block. The number of PlayItems is incremented by one for each I picture of the photo movie. Here, <xxx> shown in the syntax refers to information and description described based on the production of the photo movie. The same is true of the syntaxes discussed below.

FIG. 14 illustrates a syntax of one entry of the play item block "blkPlayItem( )" 302 of the play list information block of FIG. 13. The PlayItem is set for each I picture contained in the photo movie during the photo movie production. The PlayItem contains play item information corresponding to the I picture contained in the generated photo movie. For example, a file name of the clip information corresponding to the photo movie is recorded in a clip information file name "ClipInformationFileName" 311. Recorded in connection information "ConnectionCondition" through still display time "still_time" are a variety of information required to display the photo movie, such as display time of each I picture, presentation timestamp (PTS), mutual connection condition information of I pictures, and specifying information "IN_time" and "OUT_time" of play start time point (IN point) and play end time (OUT point) of the clip discussed with reference to FIGS. 2 and 4. A reproducing apparatus reproduces the photo movie using these pieces of information.

(b) Information Addition Process to the Photo Movie Clip Information

FIG. 15 illustrates a syntax of a clip information file. As previously discussed with reference to FIG. 12, the main controller 111 adds the information for each I picture produced in the encoding process to the clip information for the photo movie in step S212. The clip information is a file defining the attribute of the AV stream. For example, the clip information contains coding, size, time to address conversion, play management information, time map, etc. These pieces of information are produced for each I picture and recorded in the clip information.

A field "TypeIndicator" in the clip information file of FIG. 15 has a data length of 32 bits, and indicates that this file is a clip information file. Each of a "SequenceInfoStartAddress" field through a "ExtensionDataStartAddress" field has a data length of 32 bits, and indicates a start address of each data block in this syntax. The start address is indicated by relative byte numbers from a head byte defined in the file.

Actual content of the clip information file is recorded in a clip information block "blkClipInfo( )" through a clip mark block "blkClipMark." More specifically, information relating to a stream required to reproduce an actual stream is recorded in the clip information block "blkClipInfo( )" through the clip mark block "blkClipMark."

An extension data block "blkExtensionData( )" is defined when BD-ROM standard is extended to be applied to a recordable medium.

FIG. 16 illustrates a syntax of a clip information block "blkClipInfo( )" 321 of the clip information file of FIG. 15. As shown in FIG. 16, the clip information block "blkClipInfo( )" 321 contains type information such as clip stream type information "ClipStreamType," application type information "ApplicationType," and attribute information of a variety of clips.

A connection condition of each display data is set in a connection condition information recording field "isCC5". For example, one bit information <1> or <0> is set in that field, and the reproducing apparatus performs a reproducing process responsive to the set information. If <1> is set in the connection condition information recording field "isCC5", the connection condition to subsequent clip information is continuous with connection condition=5. Content (stream file) to the clip information file can be connected to the subsequent content in a seamless fashion. If <0> is set in the connection condition information recording field "isCC5", the connection condition to the subsequent clip information is not connection condition=5, and the content (stream file) to the clip information is not set to be in a seamless connection to the subsequent content.

Values based on the I picture contained in the photo movie are respectively set in transport stream rate "TSREcordingRate", and a source packet file size "NumberOfSourcePackets".

FIG. 17 illustrates a syntax of a sequence information block "blkSequenceInfo( )" 322 of the clip information file of FIG. 15. The sequence information block "blkSequenceInfo( )" 322 mainly contains sequence information such as time management information in the reproducing process. The sequence information herein is required to reproduce the photo movie. More specifically, the sequence information contains information relating to system time clock (STC), I picture presentation timestamp (PTS) information, etc.

FIG. 18 illustrates a syntax of a program information block "blkProgramInfo( )" 323 of the clip information file of FIG. 15. Program information required to reproduce the photo movie is recorded in the program information block "blkProgramInfo( )" 323. For example, the program information contains identification information of a program match table, the number of streams in a program stream, etc.

Entry point (EP) map information corresponding to the I picture for the photo movie is recorded in a CPI block "blkCPI( )" 324 of the clip information file of FIG. 15. For example, the presentation timestamp (PTS) of the I picture is set every 0.5 second, and an EP map with an entry point (EP) set therewithin is generated at the same timing.

(c) Movie Object Update Process

FIG. 19 illustrates a syntax of the movie object file. As described with reference to FIG. 12, the movie object file required in the production of the photo movie is updated in step S216 in the photo movie production sequence, and then the updated movie object file is recorded on the information recording medium. The MovieObject.bdmv file contain information regarding the movie object. When the photo movie is produced, a command to control reproduction of the photo movie needs to be added, and the MovieObject.bdmv file is updated.

As shown in FIG. 19, the MovieObject.bdmv file contains a movie object file "MovieObjects( )" 401 and an extension data block "blkExtensionData( )". FIG. 20 illustrates a syntax of the movie object file "MovieObject( )" 401.

When the photo movie is produced, the movie object number "NumberOfmobjs" is incremented by one to indicate the addition of the MovieObject for the photo movie. Furthermore, <1> is recorded in a field "number_of_navigation_commands {mobj id}" indicating the number of commands for the added move object. More specifically, a command, such as <PlayPL #XXXX>, for reproducing the PlayList for the photo movie is described in the MovieObject for the photo movie. PL #XXXX refers to a PlayList for the photo movie.

The reproducing apparatus reproduces the photo movie having the PlayList specified, by executing the command "PlayPL #XXXX" in accordance with described information of the MovieObject.

(d) Index Update Process.

FIG. 21 illustrates a syntax of the index file. With reference to FIG. 12, the index file required in the generation of the photo movie is updated and then recorded on the information recording medium in step S217 in the photo movie production sequence. The index information is recorded in the index.bdmv file. When the photo movie is produced, the index information such as a title for the photo movie is added.

As shown in FIG. 21, the index.bdmv file contains, as actual data, an application information block "ApplInfoBDMV( )," an index information block "Indexes( )" 421, and an extension data block "blkExtensionData( )" 422. FIG. 22 illustrates a syntax of the index information block "Indexes( )" 421.

When the photo movie is produced, it becomes necessary to set a title for the photo movie. The number of title field "number_of_Titles" of the index information block "Indexes( )" 421 is incremented by one. Furthermore, identification information of the MovieObject for the photo movie is recorded in a "Title mobj id ref[title id]" field.

FIG. 23 illustrates the extension data block "blkExtensionData( )" 422 of the index.bdmv file of FIG. 21. The extension data block "blkExtensionData( )" 422 can contain a variety of extension data that cannot be described in other blocks in the index information. As shown, the extension data contains a value indicating format information "AVCHD" of the recorded data in a ID1 field set as an identification information data field, and version information recorded in an ID2 field. A variety of extension data is recorded in a data block 431.

FIG. 24 illustrates the data block 431. The data block 431 can accommodate maker private data. As shown in FIG. 24, the data block 431 contains a UI (user interface) application information block "UIAppInfoAVCHD( )" 451 in AVCHD, a play list table information block "TableOfPlayLists( )" 452, and a maker private data block "MakersPrivateData( )" 453.

FIG. 25 illustrates a specific example of the UI application information block "UIAppInfoAVCHD( )" 451. The UI application information block "UIAppInfoAVCHD( )" 451 records last update person and last update process information relating to data recorded on the information recording medium. Fields of maker ID "makerID," and a maker model code "maker_model_code" respectively record a maker ID and a model code as information relating to an apparatus that has performed a last update process. Furthermore, last update date and time information is also recorded.

FIG. 26 illustrates the play list table information block "TableOfPlayLists( )" 452 of FIG. 24 in the extension data block of the index information file. The play list table information block "TableOfPlayLists( )" 452 records information relating to the PlayList. When the photo movie is produced, the number of PlayList fields "number of Title Playlist pair" is incremented by one. The "pair" means a pair of PlayList and tile. A play list filer number is set in a play list file name field "PlayList file name" and a value <2> is set in a play list attribute field "PlayList attribute" to indicate that the PlayList for the photo movie is a real play list.

FIG. 27 illustrates a first play back and top menu play list information field 471 contained in the play list table information block "TableOfPlayLists( )" in the extension data block of the index information file of FIG. 26. Information such as a menu displayed first during the playing of the information recording medium is recorded in this field. If the PlayList for the menu is produced, <1> is set in the number of play list field "number of Playlist." If the PlayList for the menu is not produced, <0> is set in the number of play list field "number of Playlist."

FIG. 28 illustrates the maker private data block "MakersPrivateData( )" 453 of FIG. 24 in the extension data block of the index information file. Recorded in this block are the maker ID and the model code. If the maker private data block "MakersPrivateData( )" 453 is not used, <0> is set in a data length field "length." If the maker private data block "MakersPrivateData( )" 453 is used, a data length matching the length of used data is recorded.

The photo movie production process for recording the photo movie identification mark on the PlayList is described below. The user may wish to store additionally data onto the information recording medium by canceling the finalized state even after the finalize process has been performed on the video camera. In view of the newly recorded still image, the photo movie produced in the finalize process is deleted. A photo movie is preferably produced with the newly recorded still image added in a subsequent finalize process. The deletion process needs to be performed after determining whether the file is a photo movie. If the photo movie production process is performed with the photo movie identification mark recorded in the play list, the photo movie, namely, the content of the photo movie and the attribute information data can be easily identified and then deleted.

Figure 29:
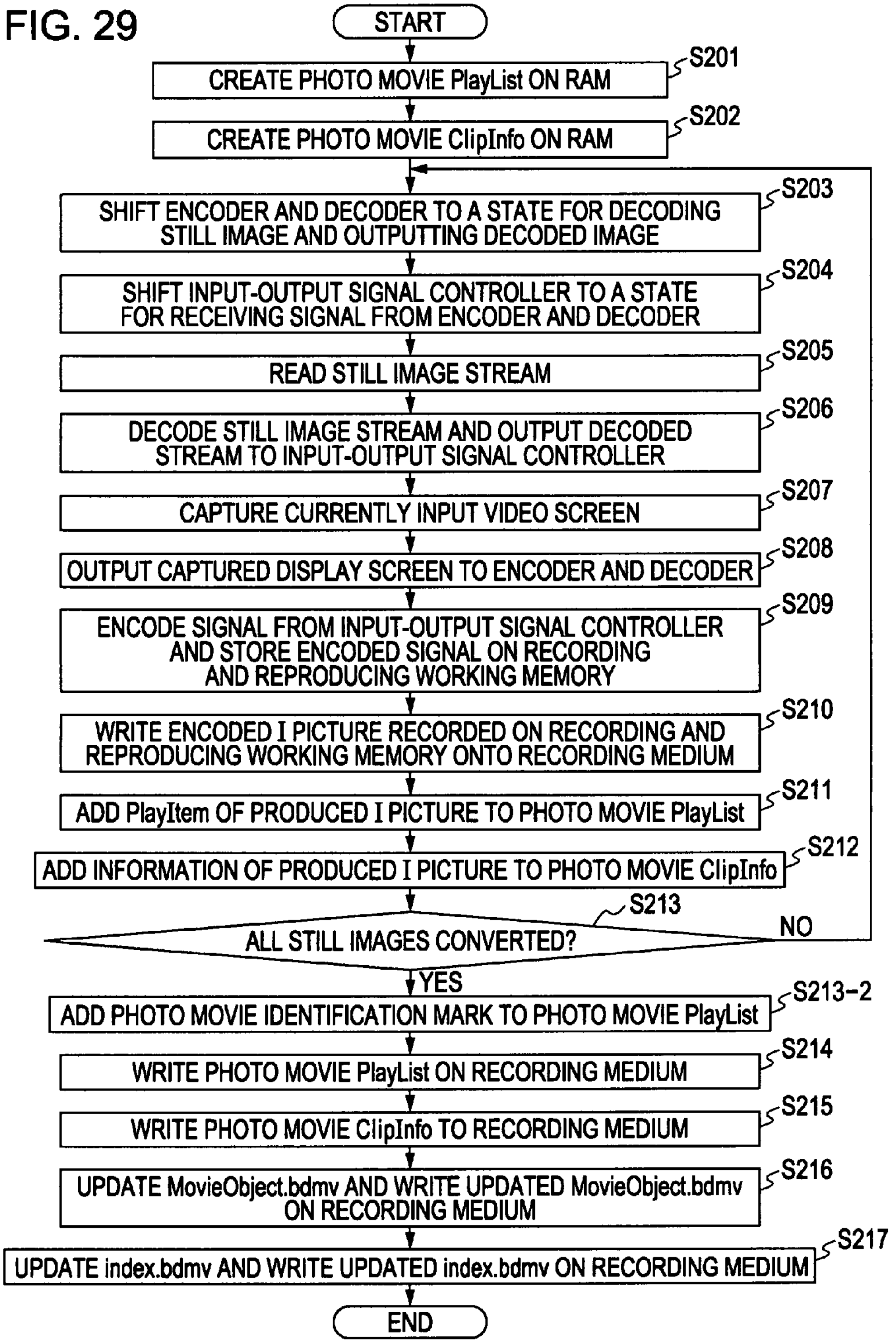
FIG. 29 is a flowchart illustrating a photo movie production sequence for recording a photo movie identification mark in the play list in accordance with one embodiment of the present invention.

FIG. 29 is a flowchart illustrating the photo movie production sequence for recording the photo movie identification mark in the PlayList. The flowchart of FIG. 29 is identical to the flowchart of FIG. 11 except that step S213-2 is added between steps S213 and S214 in FIG. 29.

In step S213-2, the photo movie identification mark is recorded in the PlayList. More specifically, the photo movie identification mark is recorded in the extension data block "blkExtensionData( )" of the PlayList discussed with reference to FIG. 12.

FIG. 30 illustrates a syntax of the extension data block "blkExtensionDat( )" in the PlayList. As shown in FIG. 30, a maker private data block "MakersPrivateData( )" 481 is recorded in the extension data block "blkExtensionData( )."

FIG. 31 illustrates a data structure of the maker private data block "MakersPrivateData( )" 481. A data block "data_block" 482 containing a variety of data is set in the data structure of the maker private data block "MakersPrivateData( )" 481. For example, the data block "data_block" 482 contains an ASCII code indicating that the PlayList corresponds to a photo movie produced by a video apparatus manufactured by an ABC company.

The finalize process may be cancelled even after the finalize process has been completed. By referencing the extension data of each PlayList, the recording and reproducing controller 110 can easily determine whether the PlayList corresponds to the photo movie. Based on the information recorded in the PlayList, the recording and reproducing controller 111 can search for and delete the actual content and the attribute data of the photo movie. More specifically, the recording and reproducing controller 110 references the PlayList to cancel the additional storage disabled state on the information recording medium 180. Based on the identification data recorded in the PlayList, the main controller 111 detects an attribute information storage file (PlayList) corresponding to the data in the moving image format produced based on the still image data. The main controller 111 deletes the content and related information of the encoded data in the moving image format produced based on the still image data. The finalize canceling process is thus quickly performed.

The present invention has been discussed with reference to specific embodiments. However, it will be apparent to those skilled in the art that changes and modifications are made to the present invention without departing from the scope of the present invention. The embodiments of the present invention have been discussed for exemplary purposes only, and are not intended to limit the scope of the present invention. The scope of the present invention is to be limited by the appended claims only.

The above-referenced series of process steps may be performed using hardware, software or a combination thereof. If the process steps are performed using software, a program of the software may be installed from a recording medium onto a computer built in dedicated hardware or a general-purpose personal computer enabled to perform a variety of functions with a variety of programs installed thereon.

The program may be pre-stored on a hard disk or a ROM. The program may also be stored (recorded) temporarily or permanently on a removable recording medium such as a flexible disk, a compact disk read-only memory (CD-ROM), a magneto-optical (MO) disk, a digital versatile disk (DVD), a magnetic disk, or a semiconductor memory. Such a removable disk may be supplied as package software.

The program may be installed on the computer from the above-mentioned removable recording medium. Alternatively, the program may be transmitted from a download side to the computer in a wireless fashion or a wired fashion using a network such as the Internet. The computer receives such a transmitted program, and installs the program onto a recording medium such as a built-in hard disk.

The process steps describing the program may be performed in the time-series order sequence as previously stated. Alternatively, the process steps may be performed in parallel or separately. In the context of this specification, the system refers to a logical set of a plurality of apparatuses and is not necessarily a single apparatus in a single casing.

What is claimed is:

1. An information processing apparatus comprising:

an encoding and decoding unit for performing a data conversion process by decoding encoded still image data acquired from an information recording medium and generating moving image encoded data based on the decoded still image data;

a medium control unit for performing a data re-recording process by recording the moving image encoded data, generated by the encoding and decoding unit, on the information recording medium in a predetermined data recording format; and a controller for:

controlling the data conversion process of the encoding and decoding unit and the data re-recording process of the medium control unit, reserving a resource associated with management of data storage on the information recording medium and that is required to be preserved to convert the still image data recorded on the information recording medium into the moving image encoded data and record the moving image encoded data onto the information recording medium, before the data conversion, referencing resource information relating to the resource, the resource information indicating a preserved number and a maximum value for the resource, during the data conversion process prior to the recording of new data onto the information recording medium or editing of content recorded on the information recording medium, determining, based on a value indicating an amount of the resource used, the maximum value for the resource and the preserved number for the resource, whether an amount of the resource to be preserved that is available is insufficient such that by the recording of the new data or the editing of the content the resource to be preserved is lost, and stopping the recording of the new data or the editing of the content when a determination is that the resource to be preserved is lost by the recording of the new data or the editing of the content, the controller controlling the data conversion process and the data re-recording process in response to user input information as to whether to execute the data conversion process.

2. The information processing apparatus according to claim 1, wherein the controller inquires a user of whether to execute the data conversion process in a transition of the information recording medium to an additional storage disabled state or in an editing of content recorded on the information recording medium, and starts the data conversion process and the data re-recording process in response to the user input information requesting the execution of the data conversion process.

3. The information processing apparatus according to claim 1, further comprising a storage unit storing the resource information relating to the resource.

4. The information processing apparatus according to claim 3, wherein the resource comprises an information storage file defined by the data recording format to the information recording medium.

5. The information processing apparatus according to claim 3, wherein the resource comprises a storage capacity of the information recording medium storing information defined by the data recording format to the information recording medium.

6. The information processing apparatus according to claim 1, wherein the controller records, in an attribute information storage file, identification data indicating that the attribute information storage file corresponds to the moving image encoded data formed based on the still image data when the data conversion process and the data re-recording process are performed.

7. The information processing apparatus according to claim 6, wherein when an additional storage disabled state is canceled in the information recording medium, the controller detects the attribute information storage file corresponding to the moving image encoded data based on the identification data, and then deletes content corresponding to the moving image encoded data and information incidental to the content.

8. The information processing apparatus according to one of claims 1 through 7, wherein a data recording format is an AVCHD format.

9. An information processing method for recording content on an information recording medium, comprising steps of:

performing a data conversion process by decoding encoded still image data acquired from an information recording medium and generating moving image encoded data based on the decoded still image data;

performing a data re-recording process by recording the moving image encoded data on the information recording medium in a predetermined data recording format; and controlling the data conversion process and the data re-recording process, wherein the controlling step includes reserving a resource associated with management of data storage on the information recording medium and that is required to be preserved to convert the still image data recorded on the information recording medium into the moving image encoded data and record the moving image encoded data onto the information recording medium, before the data conversion, wherein the controlling step further includes:

referencing resource information relating to the resource, the resource information indicating a preserved number and a maximum value for the resource, during the data conversion process prior to the recording of new data onto the information recording medium or editing of content recorded on the information recording medium, determining, based on an indication of an amount of the resource used, the maximum value for the resource and the preserved number for the resource, whether an amount of the resource to be preserved that is available is insufficient such that by the recording of the new data or the editing of the content the resource to be preserved is lost, and stopping the recording of the new data or the editing of the content when a determination is that the resource to be preserved is lost by the recording of the new data or the editing of the content, the controlling step including controlling the data conversion process and the data re-recording in response to user input information as to whether to execute the data conversion process.

10. The information processing method according to claim 9, wherein the controlling step comprises inquiring a user of whether to execute the data conversion process in a transition of the information recording medium to an additional storage disabled state or in an editing of content recorded on the information recording medium, and starting the data conversion process and the data re-recording process in response to the user input information requesting the execution of the data conversion process.

11. The information processing method according to claim 9, further comprising storing the resource information relating to the resource.

12. The information processing method according to claim 11, wherein the resource comprises an information storage file defined by the data recording format to the information recording medium.

13. The information processing method according to claim 11, wherein the resource comprises a storage capacity of the information recording medium storing information defined by the data recording format to the information recording medium.

14. The information processing method according to claim 9, wherein the controlling step comprises recording, in an attribute information storage file, identification data indicating that the attribute information storage file corresponds to the moving image encoded data formed based on the still image data when the data conversion process and the data re-recording process are performed.

15. The information processing apparatus according to claim 14, wherein the controlling step comprises detecting the attribute information storage file corresponding to the moving image encoded data based on the identification data, and then deleting content corresponding to the moving image encoded data and information incidental to the content when an additional storage disabled state is canceled in the information recording medium.

16. The information processing method according to one of claims 9 through 15, wherein a data recording format is an AVCHD format.

17. A non-transitory computer readable recording medium having stored thereon a computer program for causing an information processing apparatus to record content on an information recording medium, comprising steps of:

performing a data conversion process by decoding encoded still image data acquired from an information recording medium and generating moving image encoded data based on the decoded still image data;

performing a data re-recording process by recording the moving image encoded data on the information recording medium in a predetermined data recording format; and controlling the data conversion process and the data re-recording process, wherein the controlling step includes reserving a resource associated with management of data storage on the information recording medium and that is required to be preserved to convert the still image data recorded on the information recording medium into the moving image encoded data and record the moving image encoded data onto the information recording medium, before the data conversion, wherein the controlling step further includes:

referencing resource information relating to the resource, the resource information indicating a preserved number and a maximum value for the resource, during the data conversion process prior to the recording of new data onto the information recording medium or editing of content recorded on the information recording medium, determining, based on an indication of an amount of the resource used, the maximum value for the resource and the preserved number for the resource, whether an amount of the resource to be preserved that is available is insufficient such that by the recording of the new data or the editing of the content the resource to be preserved is lost, and stopping the recording of the new data or the editing of the content when a determination is that the resource to be preserved is lost by if the recording of the new data or the editing of the content the controlling step including controlling the data conversion process and the data re-recording in response to user input information as to whether to execute the data conversion process.

18. The information processing apparatus according to claim 1, wherein the resource includes information pertaining to a number of titles in a predetermined file.

19. The information processing apparatus according to claim 1, wherein the resource includes information pertaining to a number of playlists in a predetermined file.

20. The information processing apparatus according to claim 1, wherein the resource includes information pertaining to a number of objects in a predetermined file.

* * * * *